United States Patent
Kawata

(10) Patent No.: US 10,167,054 B2
(45) Date of Patent: Jan. 1, 2019

(54) MOTORCYCLE

(71) Applicant: SUZUKI MOTOR CORPORATION, Hamamatsu-Shi (JP)

(72) Inventor: Koichiro Kawata, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 570 days.

(21) Appl. No.: 14/805,659

(22) Filed: Jul. 22, 2015

(65) Prior Publication Data

US 2016/0023713 A1 Jan. 28, 2016

(30) Foreign Application Priority Data

| Jul. 28, 2014 | (JP) | 2014-153180 |
| Jul. 29, 2014 | (JP) | 2014-153987 |
| Aug. 1, 2014 | (JP) | 2014-157904 |

(51) Int. Cl.
| B62M 7/04 | (2006.01) |
| B62K 11/04 | (2006.01) |
| B62K 19/12 | (2006.01) |
| B62M 7/02 | (2006.01) |

(52) U.S. Cl.
CPC .......... B62M 7/04 (2013.01); B62K 11/04 (2013.01); B62K 19/12 (2013.01); B62M 7/02 (2013.01)

(58) Field of Classification Search
CPC .......... B62K 11/02; B62K 11/04; B62M 7/04
See application file for complete search history.

(56) References Cited

U.S. PATENT DOCUMENTS

| 4,327,812 A | | 5/1982 | Tominaga et al. | |
| 4,727,953 A | * | 3/1988 | Kudo | B62K 11/04 |
| | | | | 180/219 |
| 4,887,687 A | * | 12/1989 | Asai | B62K 19/12 |
| | | | | 180/219 |
| 4,989,665 A | * | 2/1991 | Yamagiwa | B62K 11/04 |
| | | | | 164/133 |
| 5,012,883 A | * | 5/1991 | Hiramatsu | B62J 17/00 |
| | | | | 180/219 |
| 6,371,236 B1 | * | 4/2002 | Fukunaga | B62K 11/02 |
| | | | | 180/219 |

(Continued)

FOREIGN PATENT DOCUMENTS

| JP | S62-54088 U | 4/1987 |
| JP | H06156348 A | 6/1994 |

(Continued)

OTHER PUBLICATIONS

DE Office Action dated Nov. 8, 2016, which issued during the prosecution of German Patent Application No. 102015111970.6.

(Continued)

*Primary Examiner* — Joseph M Rocca
*Assistant Examiner* — Daniel S Yeagley
(74) *Attorney, Agent, or Firm* — Troutman Sanders LLP

(57) ABSTRACT

The configuration includes: a right and left pair of main frames extending from a head pipe while widening rearward; and pivot frames that are welded to the main frames and extend toward the rear downward direction. Under the main frames, an engine is arranged. The main frame includes a hanging portion for holding and fastening the engine. In the front portion of the main frame, a bulge portion is disposed on the vehicle-widthwise outer side. The hanging portion is settable to the bulge portion.

20 Claims, 18 Drawing Sheets

(56) References Cited

U.S. PATENT DOCUMENTS

| | | | | |
|---|---|---|---|---|
| 7,159,885 | B2* | 1/2007 | Toyoda | B62K 11/04 180/227 |
| 7,523,800 | B2* | 4/2009 | Shinsho | B62K 11/04 180/219 |
| 8,550,200 | B2* | 10/2013 | Hori | B62K 11/04 180/219 |
| 8,678,122 | B2* | 3/2014 | Kawai | B60T 8/3685 180/219 |
| 8,985,608 | B2* | 3/2015 | Oikawa | B62J 35/00 280/281.1 |
| 2005/0150703 | A1* | 7/2005 | Nakagome | F02D 9/02 180/219 |
| 2006/0037800 | A1* | 2/2006 | Kawase | B62K 11/04 180/219 |
| 2007/0107967 | A1 | 5/2007 | Satake | |
| 2009/0095553 | A1 | 4/2009 | Iwanaga et al. | |
| 2009/0243253 | A1* | 10/2009 | Morita | B62K 11/04 280/281.1 |
| 2011/0073398 | A1 | 3/2011 | Yokoyama et al. | |

FOREIGN PATENT DOCUMENTS

| | | |
|---|---|---|
| JP | 2004-314882 A | 11/2004 |
| JP | 2007-131257 A | 5/2007 |
| JP | 2009090893 A | 4/2009 |
| JP | 2010-264832 A | 11/2010 |
| JP | 2011-073590 A | 4/2011 |
| JP | 2012-236467 A | 12/2012 |

OTHER PUBLICATIONS

Japanese Office Action dated Jul. 28, 2015 issued in corresponding Japanese Patent Application No. 2014-153180.

Japanese Office Action dated Jul. 28, 2015 issued in corresponding Japanese Patent Application No. 2014-153987.

Japanese Office Action dated Dec. 8, 2015, issued in corresponding Japanese Application No. 2014-153180.

Japanese Office Action dated Dec. 8, 2015, issued in corresponding Japanese Application No. 2014-153987.

* cited by examiner

F I G. 5
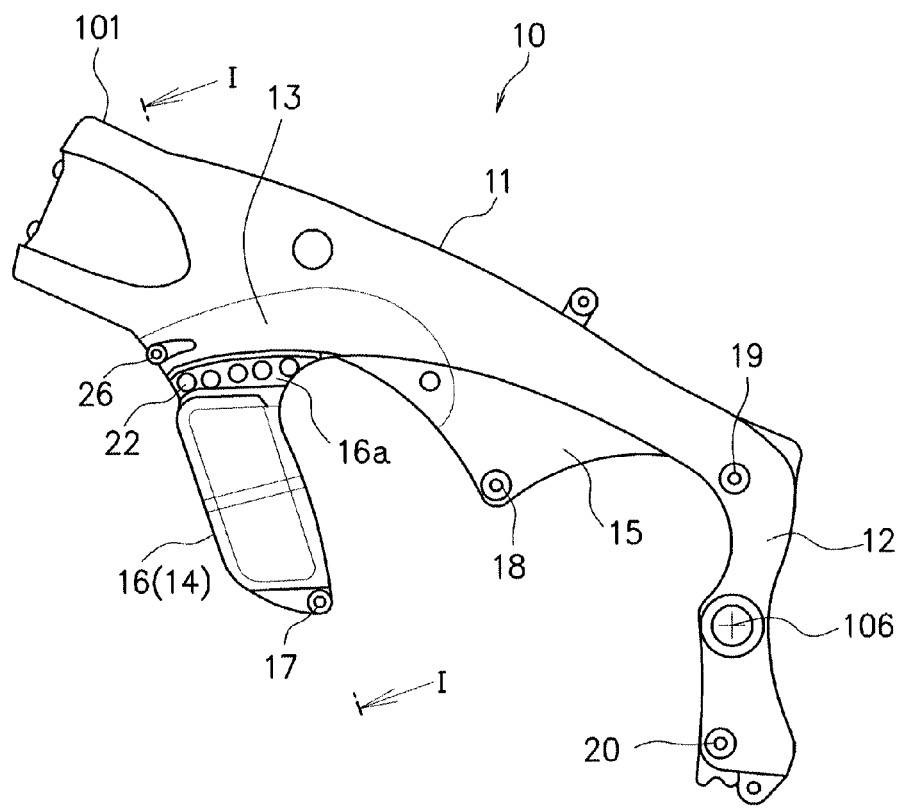
Fr　　　　　　　　　　　　　　　　　Rr

SEC. I-I

SEC. Ⅲ-Ⅲ

SEC. III-III

F I G. 11
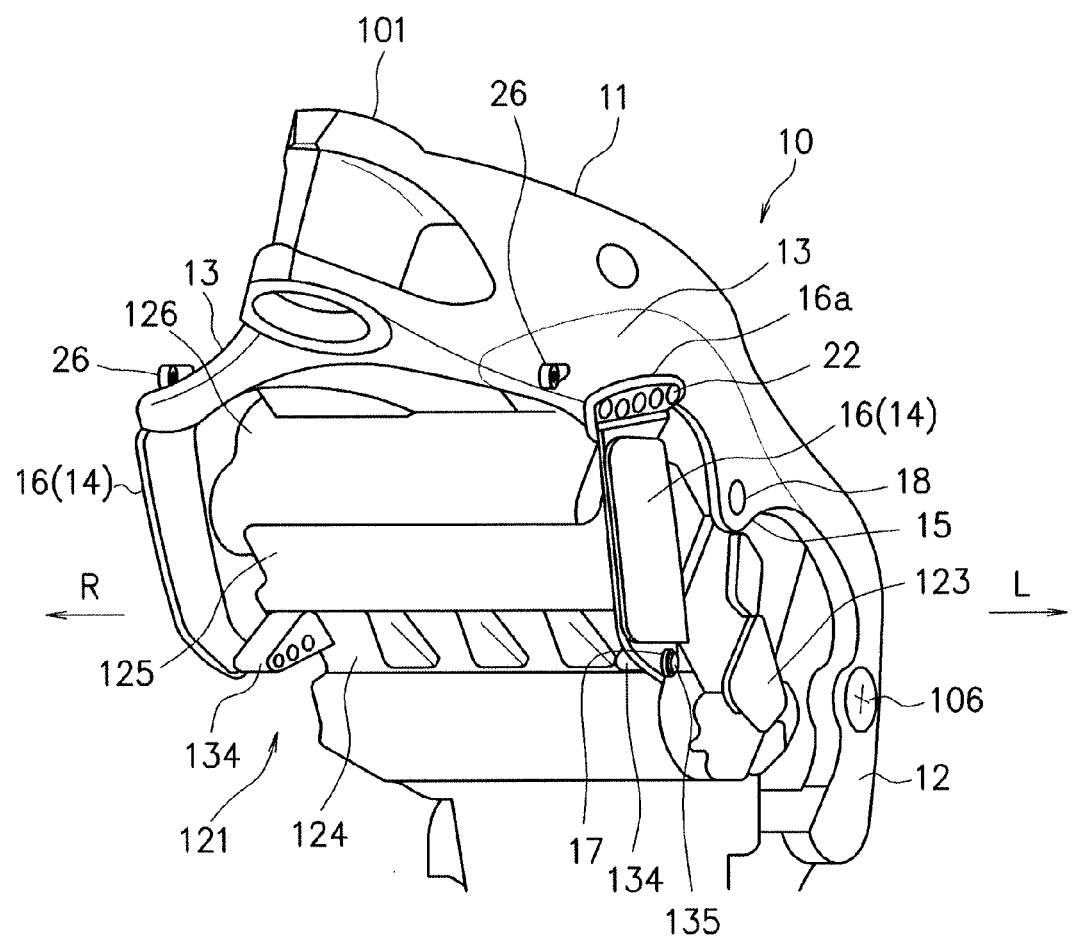

SEC. IV-IV

F I G. 14
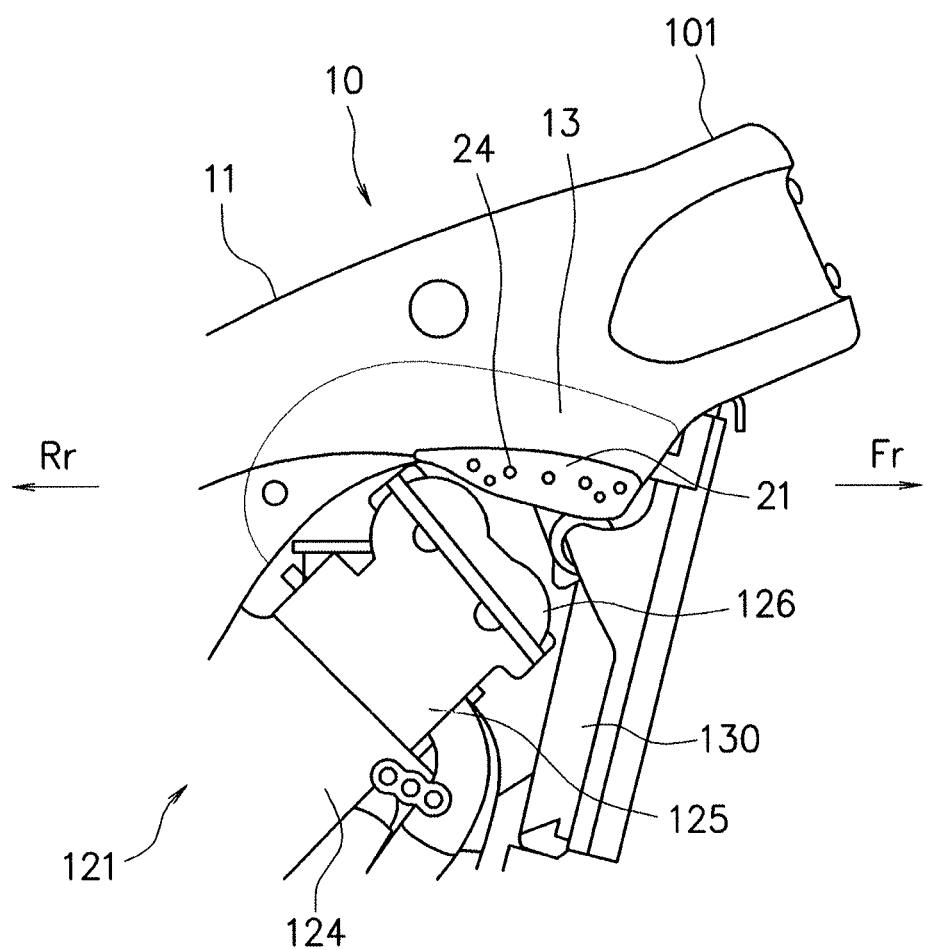

F I G. 16
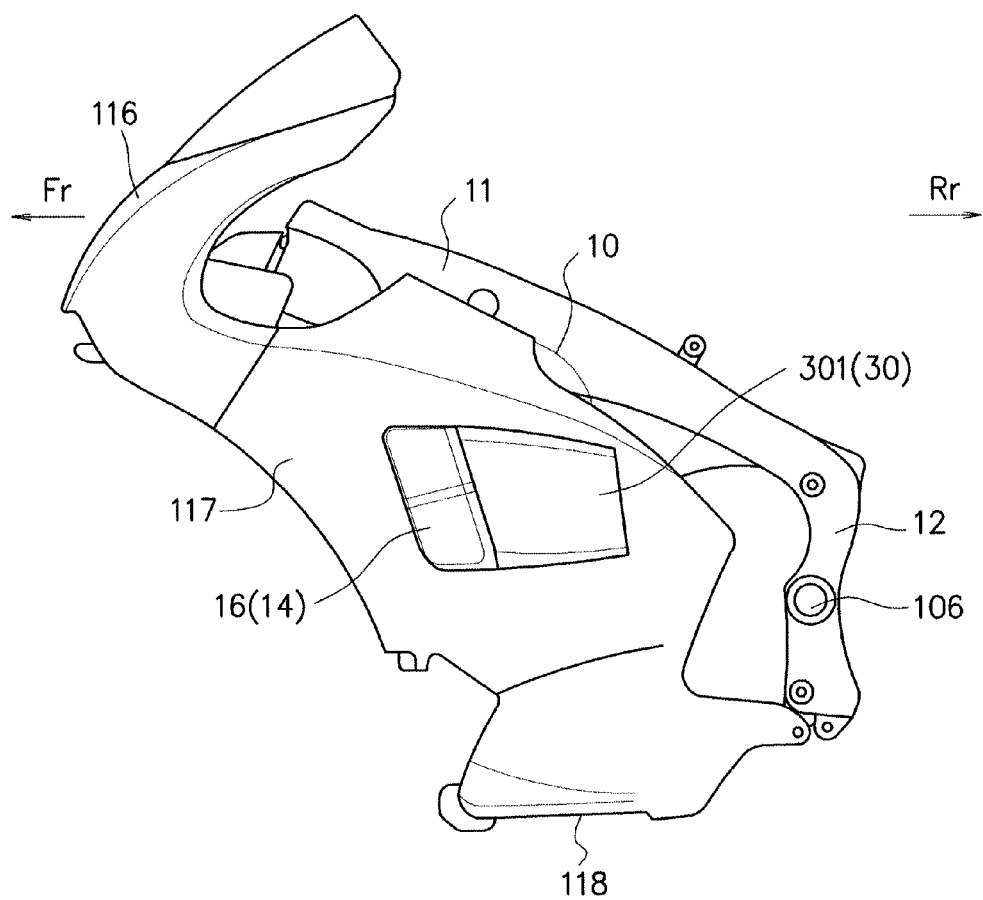

MOTORCYCLE

CROSS-REFERENCE TO RELATED APPLICATIONS

This application is based upon and claims the benefit of priority of the prior Japanese Patent Application No. 2014-153180, filed on Jul. 28, 2014, the prior Japanese Patent Application No. 2014-153987, filed on Jul. 29, 2014, and the prior Japanese Patent Application No. 2014-157904, filed on Aug. 1, 2014, the entire contents of which are incorporated herein by reference.

BACKGROUND OF THE INVENTION

Field of the Invention

The present invention relates to a motorcycle having features related to a frame structure for mounting and supporting an engine or similar member, an engine suspending structure, and a cowling.

Description of the Related Art

As this type of frame structure, for example, in a straddle-type vehicle described in Patent Document 1, an engine bracket 9, which supports an engine 8, extends in the above-below direction and is mounted on a front end portion 2e under the head pipe of a vehicle body frame 2 so as to be suspended in a front wall portion 8i of the engine 8 under that. In this case, the engine bracket 9 includes two bent portions in a vehicle side view.

In a vehicle front view of the engine bracket 9, the engine suspending portion on the lower side is fastened in one position near the vehicle body centerline. The mount to the vehicle body frame 2 on the upper side is fastened in three positions near the vehicle body centerline within the frame outer shape. The mount of the radiator is mounted on the engine bracket 9.

Motorcycles include a type having a cowling (sometimes referred to as a "cowl body"), which covers the outer side of equipment such as the engine. Patent Document 2 discloses the configuration where of a motorcycle having a cowling for continuously covering the portion from both right and left sides to the lower side in the engine with the cowling. Then, in the case of a watercooled engine, a radiator for cooling a refrigerant (cooling water) is disposed. Accordingly, the cowling has an air intake hole for taking in the air supplied to the radiator and an air discharge hole for discharging the air having passed the radiator to the outer side. Patent Document 2 discloses the configuration where the air discharge hole is disposed on the side surface of the cowling.

Patent Document 1: Japanese Laid-open Patent Publication No. 2009-90893
Patent Document 2: Japanese Laid-open Patent Publication No. 06-156348

The conventional example like Patent Document 1 in which the engine bracket 9 has the bent portions causes reduction in longitudinal stiffness (axial force) of the engine bracket 9 as it is. This requires increasing the plate thickness of the engine bracket 9 or selecting a type of material having high mechanical strength, thus causing weight increase and cost increase.

Furthermore, the narrow mounting width of the engine bracket 9 and the presence of the bent portions cause a low contribution rate for improving the longitudinal stiffness or the torsional stiffness of the vehicle body. Further, mounting the radiator on the engine bracket 9 might cause resonance due to engine vibration. Accordingly, the increase in thickness of the engine bracket 9 and similar measure required to ensure sufficient support stiffness causes weight increase.

Because the tightening position on the vehicle body frame side in the engine bracket 9 hides behind the radiator, removal of the engine bracket 9 requires to remove the radiator. Accordingly, the work must require a lot of labor.

Further, the air discharge hole like Patent Document 2 discharges the air having passed the radiator rearward and obliquely outward, and thus is opened to face the rear and obliquely outer side. This configuration allows seeing the exposed equipment such as the engine through this air discharge hole when the motorcycle is viewed from the rear and obliquely outer side. This causes a problem that ruins the beauty of the motorcycle's appearance.

Methods for hiding the inside equipment through the air discharge hole include a method for molding a portion that overlaps the air discharge hole so as to hide this air discharge hole in the cowling. However, the configuration that manufactures the cowling by injection molding does not allow formation of the portion overlapping the air discharge hole in the cowling.

SUMMARY OF THE INVENTION

The present invention has been made in view of the above-described problems, and it is an object of the present invention to provide a motorcycle that effectively achieves optimization of vehicle body stiffness balance, reduction in the number of components, weight reduction, cost reduction, and similar advantage.

It is another object of the present invention to provide a motorcycle that effectively achieves working efficiency, weight reduction, cost reduction, and similar advantage.

It is still another object of the present invention to provide a motorcycle having a cowling that improves the beauty of the appearance.

A motorcycle according to the present invention includes a vehicle body frame, an engine, and hanging portions for holding and fastening the engine to the main frames. The vehicle body frame includes: a right and left pair of main frames extending from a head pipe while widening rearward; and pivot frames welded to the main frames. The pivot frames extend toward a rear downward direction. The engine is arranged under the main frame. The main frame includes a front portion having a bulge portion on a vehicle-widthwise outer side, and the hanging portion is settable to the bulge portion.

In the motorcycle according to the present invention, the hanging portion is set to two front and rear positions of: a front hanging portion in the front portion; and a rear hanging portion in a center portion, in the main frame.

In the motorcycle according to the present invention, the bulge portion of the main frame is disposed in a position in continuous contact with the front hanging portion of the main frame.

In the motorcycle according to the present invention, the front hanging portion is constituted by a separate engine suspending bracket, and is mounted on the main frame by being bolt-fastened to a bracket installation surface disposed integrally with a distal end of the bulge portion of the main frame.

In the motorcycle according to the present invention, the bracket installation surface disposed in the main frame expands upward with respect to a vehicle body centerline in a vehicle front view.

The motorcycle according to the present invention further includes a radiator installed on a vehicle front side of the front hanging portion. The radiator has an upper mounting portion disposed integrally with the bulge portion of the main frame.

In the motorcycle according to the present invention, the bracket installation surfaces are disposed in positions having a width approximately identical to an entire lateral width of the radiator.

In the motorcycle according to the present invention, the upper mounting portion of the radiator is arranged integrally with the bulge portion of the main frame above and on an inner side of the bracket installation surface.

In the motorcycle according to the present invention, the main frame has a closed cross-sectional structure from a rear side of the head pipe, and has an open cross-sectional structure having a vehicle-widthwise opening in a range of the rear hanging portion.

In the motorcycle according to the present invention, the front hanging portion and the rear hanging portion are fastened to the engine in engine suspending positions, the engine suspending positions being set to face one another in positions having approximately identical widths and heights with respect to a cylinder axis and a crank axis of the engine.

In the motorcycle according to the present invention, the front hanging portion is configurable by an integral structure with the main frame, and is formable by light alloy die-casting or casting.

The motorcycle according to the present invention further includes a heat replacer and hanging portions for holding and fastening the engine. The heat replacer is equipped on a vehicle front side of the engine. The heat replacer includes a radiator and an oil cooler. The hanging portions are set to two front and rear positions of a front portion and a center portion in the main frame. The hanging portion of the front portion is constituted by a separate engine suspending bracket. The engine suspending bracket is: mounted on the engine side by being fastened with bolts to a suspension boss portion disposed integrally with a crankcase or a cylinder block on; and mounted on the vehicle body frame side by being fastened with bolts to a bracket installation surface disposed integrally with a distal end of the bulge portion of the main frame.

In the motorcycle according to the present invention, the engine suspending bracket bridged between the engine and the main frame is tightened in a position that allows tightening both the engine and the main frame from a vehicle lateral side of the motorcycle.

In the motorcycle according to the present invention, the engine suspending bracket overlaps a part of the engine in a vehicle side view.

In the motorcycle according to the present invention, the engine suspending bracket has an inner surface having a gap with a cylinder and a cylinder head of the engine in a vehicle top view. The inner surface guides heat generated in the radiator to a rear side of a vehicle body. The engine suspending bracket has an inner surface shape formed expanding outward.

In the motorcycle according to the present invention, the radiator is surrounded by the engine suspending bracket and the bulge portion disposed in a front side of the main frame in a vehicle front view.

In the motorcycle according to the present invention, the engine suspending bracket is arrangeable overlapping the radiator arranged on a vehicle front side.

In the motorcycle according to the present invention, the suspension boss portion as a mounting portion of the engine suspending bracket on the engine side has a mounting width approximately identical to a mounting width of the bracket installation surface of the bulge portion as a mounting portion on the main frame side.

In the motorcycle according to the present invention, the bracket installation surface disposed in the main frame expands upward with respect to a vehicle body centerline in a vehicle front view.

In the motorcycle according to the present invention, the engine suspending bracket is bridged over an above-below direction from the bracket installation surface of the main frame to the suspension boss portion on the crankcase side, and the engine suspending bracket has a main body surface arranged approximately parallel to a vehicle body centerline.

In the motorcycle according to the present invention, the radiator has: an upper end portion bolt-fastened to an upper mounting portion arranged integrally with the bulge portion of the main frame; and a lower end portion bolt-fastened to a predetermined portion of the oil cooler.

The motorcycle according to the present invention further includes: a radiator configured to cool a refrigerant of the engine; and a cowling that covers an outer side of the engine. The cowling includes, on its lateral side, an air discharging portion configured to discharge air having passed the radiator to an outside of the cowling. The engine suspending bracket that secures the engine to the vehicle body frame is formed separately from the vehicle body frame, and overlaps at least a part of the air discharging portion in a vehicle side view.

In the motorcycle according to the present invention, the air discharging portion includes: an air discharge hole opened in a vehicle side view; and a stepped portion disposed on a rear side of the air discharge hole. The stepped portion is depressed to a vehicle-widthwise inner side. The stepped portion is formed in a shape along an outer shape of equipment arranged on an inner side of the cowling.

In the motorcycle according to the present invention, a part of the engine suspending bracket overlaps a part of the stepped portion in a vehicle side view.

In the motorcycle according to the present invention, the radiator is arranged in a position surrounded by the bulge portion and the engine suspending bracket in a vehicle front view.

In the motorcycle according to the present invention, the engine suspending bracket has a vehicle-widthwise outer side surface formed in a shape continuous with a vehicle-widthwise outer side surface of the cowling. The engine suspending bracket has a vehicle-widthwise inner side surface inclined to expand to the vehicle-widthwise outer side toward a rear side.

BRIEF DESCRIPTION OF THE DRAWINGS

FIG. 5 is a left side view of the vehicle body frame according to the embodiment of the present invention;

FIG. 11 is a perspective view illustrating the vehicle body frame on which the engine is mounted according to the embodiment of the present invention;

FIG. 14 is a right side view of the vehicle body frame from which an engine suspending bracket is removed according to the embodiment of the present invention;

FIG. 16 is a side view schematically illustrating the configuration example of the cowling according to the embodiment of the present invention;

DETAILED DESCRIPTION OF THE PREFERRED EMBODIMENTS

The following describes preferred embodiments of a motorcycle according to the present invention based on the drawings.

Figure 1:
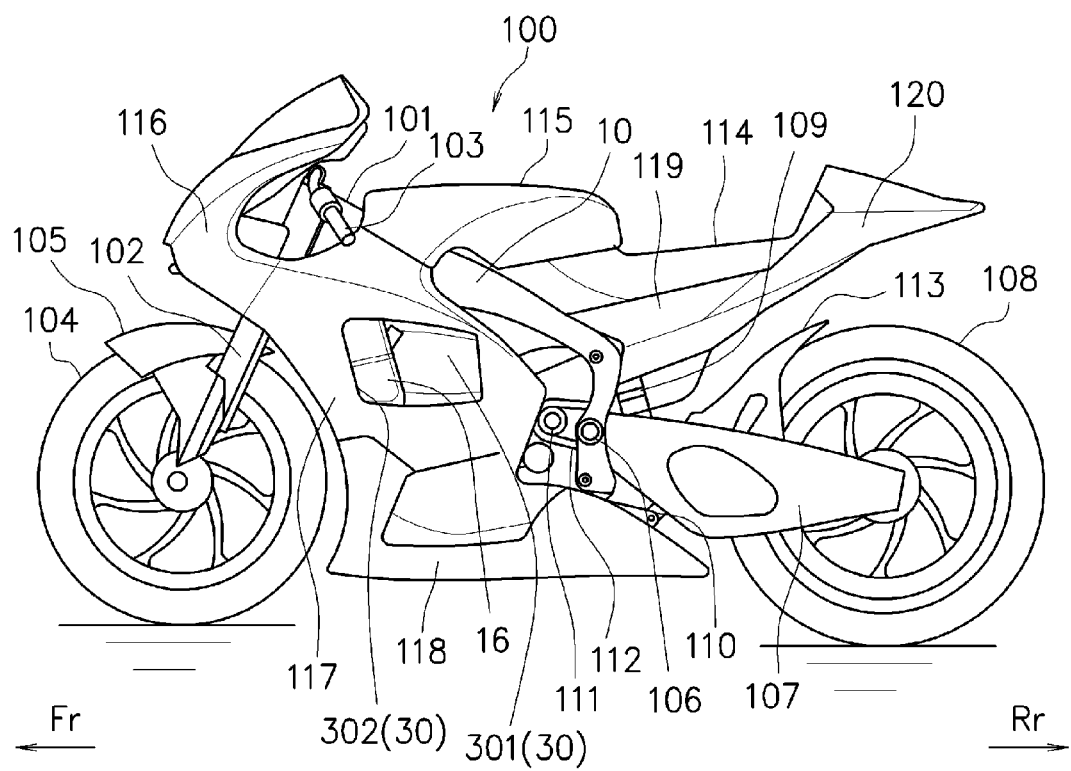
FIG. 1 is a side view of a motorcycle according to an embodiment of the present invention.

FIG. 1 is a side view illustrating the schematic configuration of a motorcycle 100 as an application example of the present invention. Firstly, the overall configuration of the motorcycle 100 will be described using FIG. 1. Here, in the drawings including FIG. 1 used in the following description, as necessary, the front side of a vehicle is illustrated by an arrow Fr and the rear side of the vehicle is illustrated by an arrow Rr. The lateral right side of the vehicle is illustrated by an arrow R and the lateral left side of the vehicle is illustrated by the arrow L.

In FIG. 1, the motorcycle 100 has a vehicle body frame 10 made of steel or aluminum alloy material, and this vehicle body frame 10 supports the configuration members including an engine or the components. In the front portion of the vehicle body frame 10, two right and left front forks 102 are disposed. The front forks 102 are supported by the steering head pipe 101 (see also FIG. 2) turnably to the right and left. To the upper end of the front fork 102, a handlebar 103 is secured via a steering bracket. In the lower portion of the front fork 102, a front wheel 104 is rotatably supported and a front fender 105 is mounted to cover the upper portion of the front wheel 104.

Figure 2:
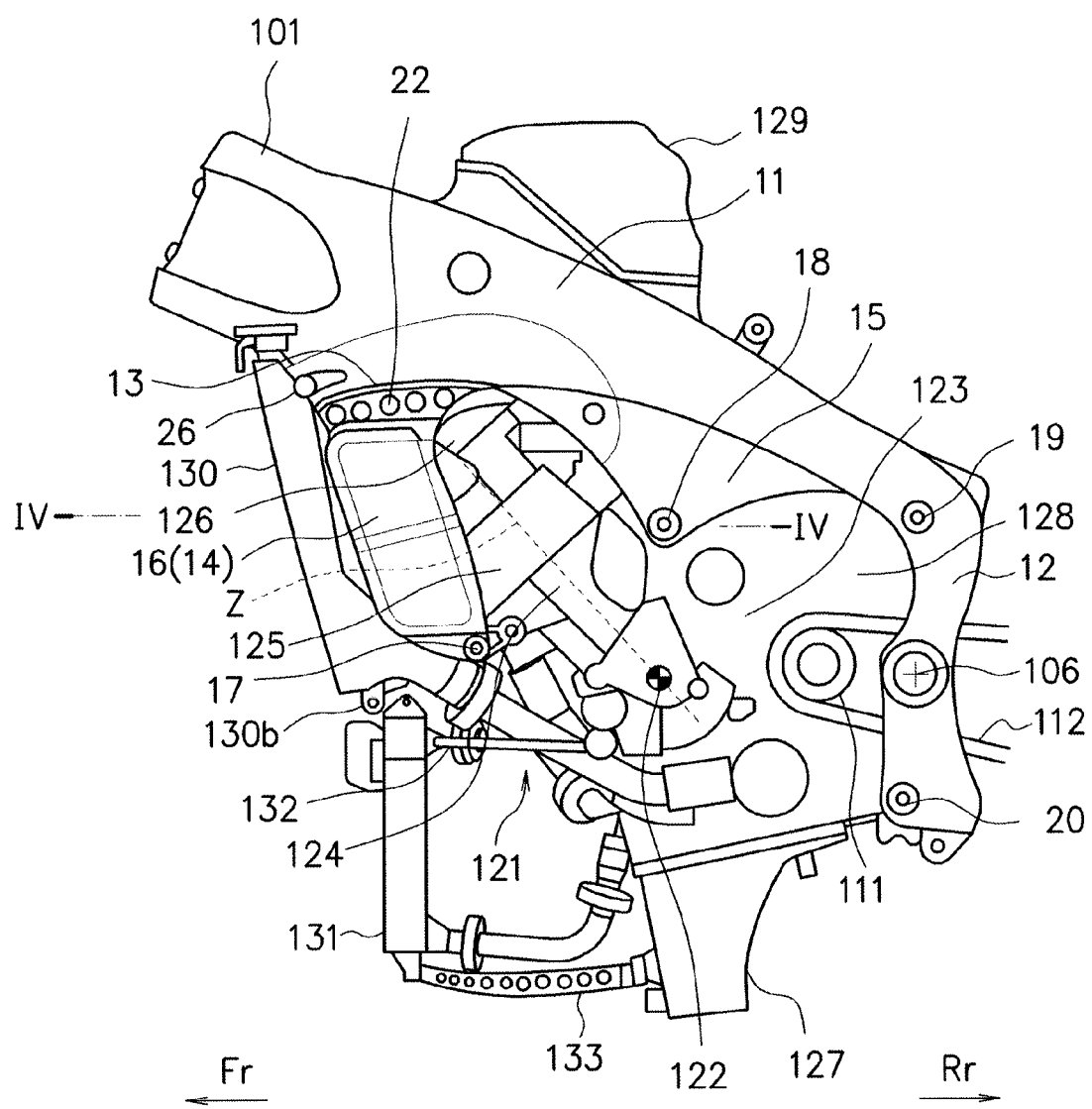
FIG. 2 is a side view illustrating a vehicle body frame on which an engine is mounted according to the embodiment of the present invention.

Here, as illustrated in FIG. 2, the vehicle body frame 10 is joined integrally to the rear portion of the steering head pipe 101 and branches into a right and left pair of two portions rearward. The vehicle body frame 10 is constituted of main frames 11, which extend from the steering head pipe 101 while widening in the rear downward direction, and pivot frames 12, which are welded to the main frames 11 and extend in the rear downward direction, as what is called a twin-spar frame. The main frame 11 and the pivot frame 12 are joined together, and have a three-dimensional structure where a space is formed inside as a whole. Inside the space, an engine described later is mounted under the vehicle body frame 10. Here, a pivot axis 106 described later is set to the pivot frame 12.

In the middle of the pivot frame 12 of the vehicle body frame 10 in the above-below direction, a swing arm 107 is combined swingably around the pivot axis 106 in the above-below direction. On the rear end of the swing arm 107, a rear wheel 108 is rotatably supported. Across the vehicle body frame 10 and the swing arm 107, a rear shock absorber 109 is mounted. Specifically, the lower end side of the rear shock absorber 109 couples to both the vehicle body frame 10 and the swing arm 107 via a link mechanism 110. On the rear wheel 108, a driven sprocket is axially supported. With reference to FIG. 2, a power transmission chain 112 is wound around a drive sprocket 111 on the engine side and the driven sprocket of the rear wheel 108. The engine power is transmitted from the drive sprocket 111 to the driven sprocket via the chain 112. This rotatably drives the rear wheel 108. In the closest vicinity of the rear wheel 108, a rear fender 113 is disposed. The rear fender 113 covers the vicinity of the front upper portion of the rear wheel 108.

From the vicinity of the rear portion of the vehicle body frame 10 to the upper side of the rear wheel 108, a seat rail (not illustrated) extends rearward while being appropriately inclined to rise rearward. This seat rail supports a seat (sitting seat) 114. On the front side of the seat 114, a fuel tank (not illustrated) covered with a tank cover 115 is mounted.

In the vehicle exterior, the front portion and both right and left side portions of the vehicle are mainly covered with respective cowlings (hereinafter referred to simply as cowls). In this example, an upper cowl 116, a body cowl 117, and an under cowl 118 integrally cover the vehicle front portion, and side cowls 119 covers both the vehicle side portions. In the vehicle rear portion, a seat cowl 120 covers and surrounds the seat 114.

Approximately in the vehicle center of the motorcycle 100, as illustrated in FIG. 2, an engine 121 is mounted on the vehicle body frame 10. The engine 121 in this embodiment employs a water-cooled multicylinder four-cycle gasoline engine. In FIG. 2, the engine 121 is a parallel multi-cylinder engine where cylinders are arranged side by side in the right-left direction (the vehicle-width direction). Over a crankcase 123, which houses a crankshaft 122 horizontally supported in the right-left direction, a cylinder block 124, a cylinder head 125, and a cylinder head cover 126 are integrally joined to be sequentially overlapped. Under the crankcase 123, an oil pan 127 is attached. Here, a cylinder axis Z of the engine 121 is arranged to be appropriately inclined forward. This engine 121 is suspended via a plurality of engine mounts (an engine suspending portion) to be integrally combined and supported on the inner side of the vehicle body frame 10, and itself acts as the rigid member of the vehicle body frame 10.

In the rear portion of the crankcase 123, a transmission case 128 is integrally formed. Inside this transmission case 128, a countershaft and a plurality of transmission gears (not illustrated) are arranged. The power of the engine 121 is transmitted from the crankshaft 122 through the transmission finally to the drive sprocket 111, which is the output end of the engine 121. This drive sprocket 111 rotatably drives the rear wheel 108 (in FIG. 1) via the power transmission chain 112 as described above.

Here, the crankcase 123 and the transmission case 128 are integrally combined together, and wholly constitute a casing assembly of an engine unit including the engine 121. In the appropriate positions in this casing assembly, a plurality of auxiliary machines including a starter motor for starting the engine, a clutch device, and similar member are mounted or combined. The entire engine unit including these is supported by the vehicle body frame 10.

To the engine 121, additionally, an intake system, an exhaust system, a cooling system, a lubricating system, and a control system (ECU; Engine Control Unit) are attached. The intake system supplies air-fuel mixture containing air (intake air) and fuel supplied respectively from an air cleaner and a fuel supply device. The exhaust system discharges burnt exhaust gas from the engine 121. The cooling system cools the engine 121. The lubricating system lubricates movable parts of the engine 121. The control system controls the operations of these systems. The control of the control system causes the plurality of functional systems to collaborate with the above-described auxiliary machines so as to perform a smooth operation as the entire engine unit.

The respective functional systems will be described while the detailed illustration and similar illustration are omitted in FIG. 2. Firstly, in the intake system, each cylinder has an air intake opening (an intake port) opened on the rear side of the cylinder head 125, and this air intake opening couples to a throttle body via an air intake pipe (an intake pipe). The throttle body is mounted with a throttle valve that opens and closes an intake passage or a passage formed inside the throttle body corresponding to the accelerator position, so as to control the flow rate of the air supplied from an air cleaner 129. In this example, the throttle valve axes of the respective cylinders are coaxially arranged. This throttle valve axes are mechanically, electrically, or electromagnetically driven by a valve driving mechanism.

On the other hand, the respective throttle bodies have injectors for fuel injection arranged in the downstream of the throttle valves. To these injectors, fuel in the fuel tank is supplied by a fuel pump. In this case, each injector couples to, in its upper side, a delivery pipe laterally bridged in the vehicle-width direction. The fuel is delivered from the delivery pipe coupled to the fuel pump. Each injector injects the fuel to the intake passage inside the throttle body at a predetermined timing by the control of the above-described control system. This causes supply of air-fuel mixture at a predetermined air-fuel ratio to the cylinder blocks 124 of the respective cylinders.

Next, in the exhaust system, each cylinder has an air exhaust opening (an exhaust port) opened on the front side of the cylinder head 125, and this air exhaust opening couples to air exhaust pipe (an exhaust pipe). The air exhaust pipes of the respective cylinders once extend downward from the air exhaust openings, and are joined to be integrated in the lower side of the crankcase 123. The air exhaust pipe extends rearward, and a muffler is mounted on the rear end of the air exhaust pipe.

In the cooling system, near the cylinder block 124 and the cylinder head 125, a water jacket, which is formed to circulate cooling water, is constituted. A radiator 130, which cools the cooling water supplied to this water jacket, is equipped. In this example, the radiator 130 has an approximately laterally-long rectangular (rectangle) shape in a vehicle front view as described later. As illustrated in FIG. 2, the radiator 130 is arranged extending while being appropriately inclined forward from the vicinity of the lower portion of the steering head pipe 101 to the vicinity of the front side of the crankcase 123. The cylinder block 124 of the engine 121 is approximately covered with the radiator 130 in a vehicle front view. Here, the radiator 130 is supported using the vehicle body frame 10 and similar member as described later in their appropriate positions.

Further, the lubricating system is constituted to supply lubricating oil to the movable parts of the engine unit to lubricate these parts. While the detailed illustration is similarly omitted, this lubricating system includes valve gears, which are constituted in the crankshaft 122 and the cylinder head 125, a cam chain, which couples these valve gears, the transmission, and similar member. In this embodiment, the lubricating system employs an ordinary oil pump. This oil pump supplies the lubricating oil pumped from the oil pan 127 to the lubricating system. There is an oil cooler 131 for cooling the lubricating oil supplied to the lubricating system by the oil pump. Like FIG. 2, this oil cooler 131 is supported by a plurality of stays 132 and 133 under the radiator 130. Here, these stays 132 and 133 are combined with the crankcase 123 side.

The following specifically describes, in particular, the vehicle body frame structure, the engine suspending structure using this structure, and similar structure in the motorcycle 100 according to the present invention. As described above, the vehicle body frame 10 is constituted of: the right and left pair of main frames 11, which extends from the steering head pipe 101 while widening rearward; and the pivot frames 12, which are welded to the main frames 11 and extend downwardly rearward. Among them, the main frame 11 includes a hanging portion for holding and fastening the engine 121. Specifically, as illustrated in FIG. 3, characteristically, a bulge portion 13 is disposed on the vehicle-widthwise outer side in the front portion of the main frame 11, and the hanging portion described later is settable to this bulge portion 13.

Figure 3:
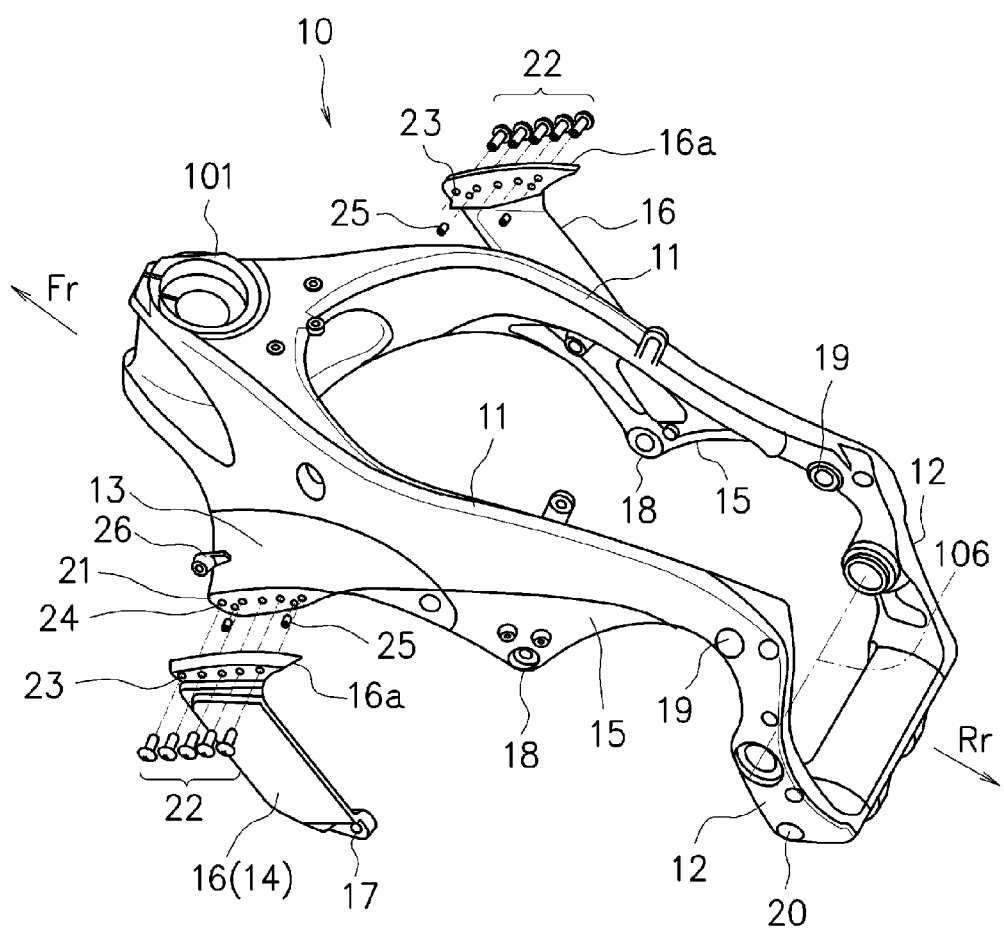
FIG. 3 is an exploded perspective view illustrating the vehicle body frame according to the embodiment of the present invention.
Figure 4:
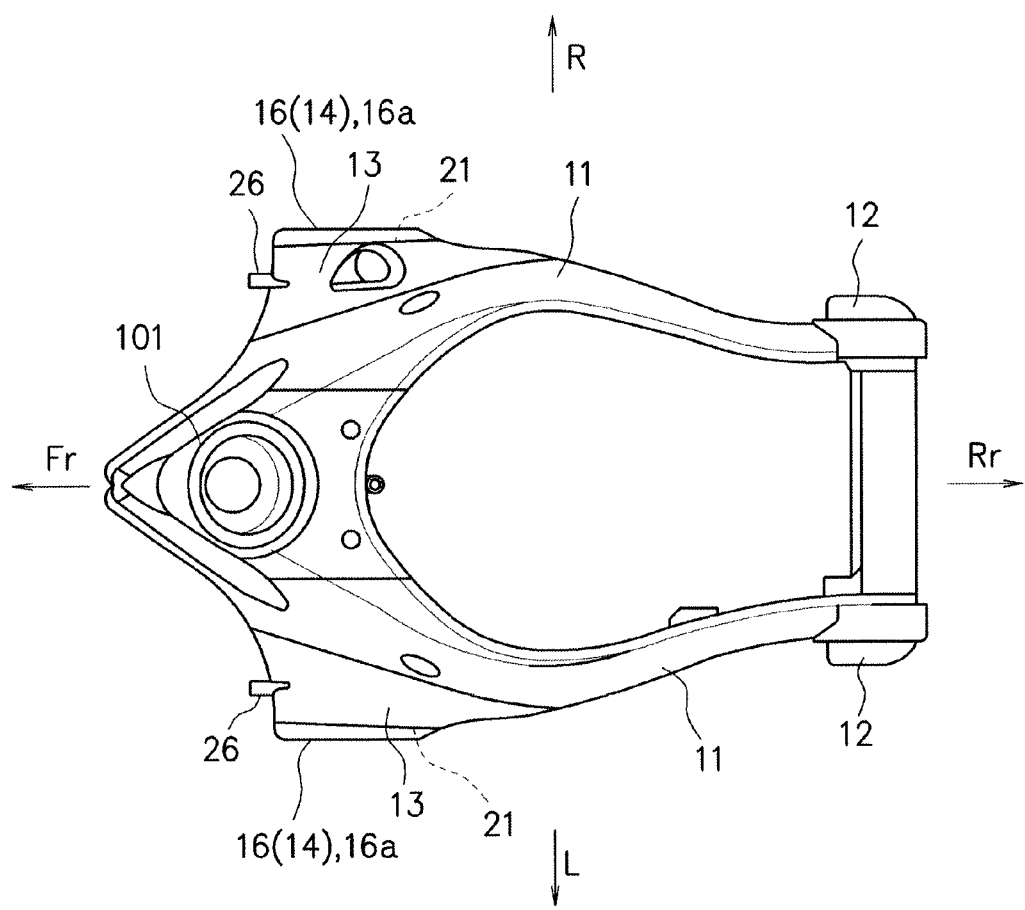
FIG. 4 is a vehicle body frame according to the embodiment of the present invention.
Figure 6:
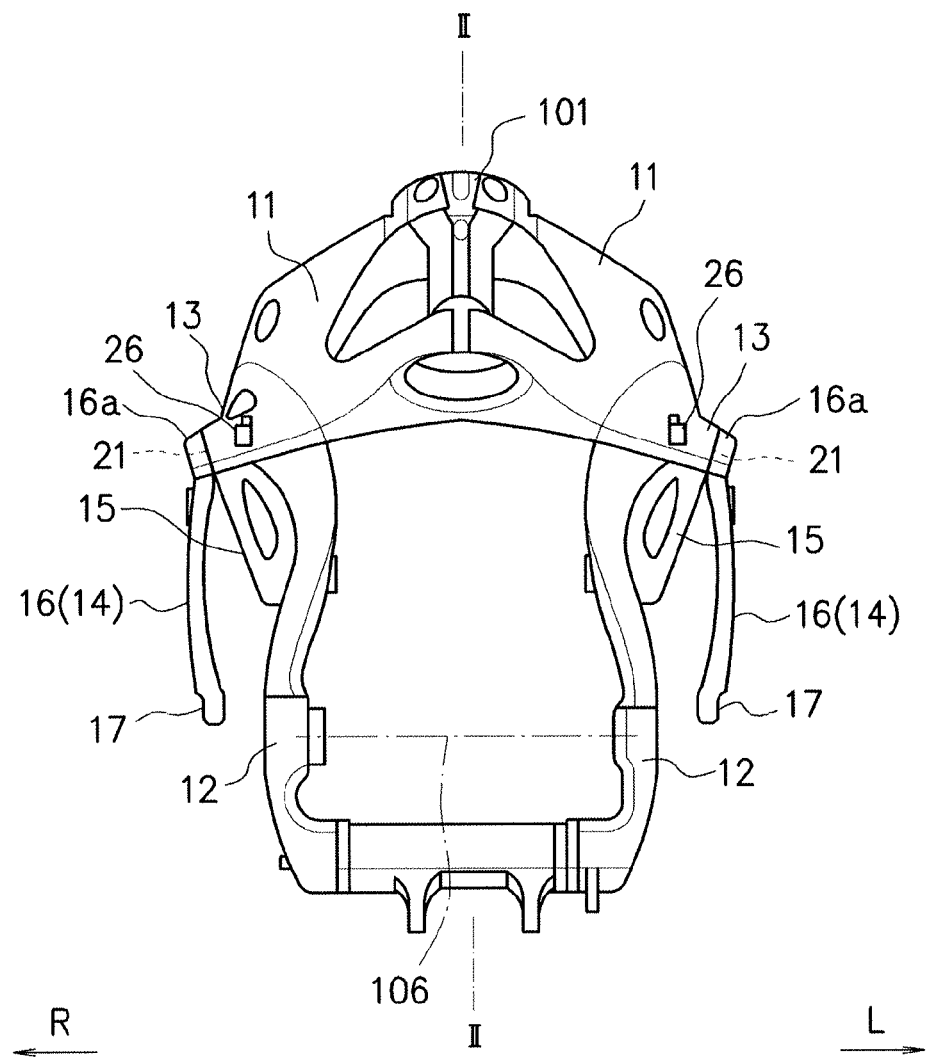
FIG. 6 is a front view of the vehicle body frame according to the embodiment of the present invention.

Like FIG. 3, the bulge portions 13 have small wing shapes extending to the right and left outer sides near the shoulder portions of the pair of main frames 11, and have cross-sectional shapes approximated by wings as longitudinal cross-sectional shapes along the front-rear direction. The bulge portion 13 and the main frame 11 are formed continuously with each other with a smooth curved surface, and both are integrally molded. Here, the following description refers to FIGS. 4 to 6 as necessary. FIG. 4 is a top view of the vehicle body frame 10, FIG. 5 is its left side view, and FIG. 6 is its front view.

Here, the hanging portion for holding and fastening the engine 121 includes a front hanging portion 14, which is set to the front portion in the main frame 11, and a rear hanging portion 15, which is set to the center in the main frame 11. These front hanging portion 14 and rear hanging portion 15 in two front and rear positions extend downward from the main frame 11, and hang and support, that is, suspend the engine 121 like FIG. 2. Here, similarly to the case of the vehicle left side illustrated in FIG. 2, hanging portions in two front and rear positions are disposed on the vehicle right side.

The bulge portion 13 of the main frame 11 is disposed in the position in continuous contact with the front hanging portion 14. In the present invention, particularly, the front hanging portion 14 is constituted by a separate engine suspending bracket 16. This engine suspending bracket 16 is mounted on the bulge portion 13. Like FIG. 2, the front hanging portion 14, that is, the engine suspending bracket 16 has an approximately vertically long rectangular shape in a vehicle side view and has, in its lower end, a front-lower suspending portion 17 for suspending the engine 121. The rear hanging portion 15 has an approximately inverted triangular shape (or what is called the inverted Fuji shape) in a vehicle side view and has, in its lower end, a front-upper suspending portion 18 for suspending the engine 121. The front-lower suspending portion 17 of the engine suspending bracket 16 is tightened and attached, via bolts, to the front lower portion (or, possibly, the right and left end portions near the front-side lower portion of the cylinder block 124) of the above-described casing assembly of the engine unit including the engine 121. The front-upper suspending portion 18 of the rear hanging portion 15 is tightened and attached, via bolts, to the front upper portion of the casing assembly. The respective portions suspend the engine 121.

As illustrated in FIG. 2 and similar figure, the upper portion of the pivot frame 12 has a rear-upper suspending portion 19 for suspending the engine 121. The lower portion of the pivot frame 12 has a rear-lower suspending portion 20. The rear-upper suspending portion 19 of the pivot frame 12 is tightened and attached, attached, via bolts, to the rear upper portion of the casing assembly. The rear-lower suspending portion 20 is tightened and attached, via bolts, to the rear lower portion of the casing assembly. The respective portions suspend the engine 121. Thus, in this example, the four engine mounts are set on both the right and left sides of the engine 121.

As illustrated in FIG. 3, the engine suspending bracket 16 is mounted by being fastened with bolts 22 to the bracket installation surface 21 disposed integrally with the distal end of the bulge portion 13 of the main frame 11. Here, in this example, the engine suspending bracket 16 can be made of carbon-fiber-reinforced plastic (CFRP). In this case, an upper end portion 16a of the engine suspending bracket 16 has an internal surface having the shape substantially identical to that of the bracket installation surface 21 and has a plurality of (in this example, five) bolt insertion holes 23 formed approximately in the front-rear direction. In the bulge portion 13, screw holes (internal threads) 24, on which the bolts 22 are threadably mounted, are formed. When the upper end portion 16a of the engine suspending bracket 16 is tightened and attached to the bulge portion 13, knock pins 25 for positioning between both are anchored. This allows fixedly mounting the engine suspending bracket 16 on the bulge portion 13, that is, the main frame 11 with high positional accuracy.

As illustrated in FIG. 5 and similar figure, the engine suspending bracket 16 mounted as described above is appropriately arranged in the forward-inclined posture such that the upper end portion 16a side is shifted forward. As illustrated in FIGS. 4 and 6, the engine suspending brackets 16 are positioned on the outer side of the bulge portion 13 so as to form the maximum lateral width of the main frame 11. As illustrated in FIG. 1, the engine suspending bracket 16 thus mounted is correspondingly arranged along the air discharge hole 302 formed in the body cowl 117, and constitutes a part of the appearance design of the motorcycle 100.

Figure 7:
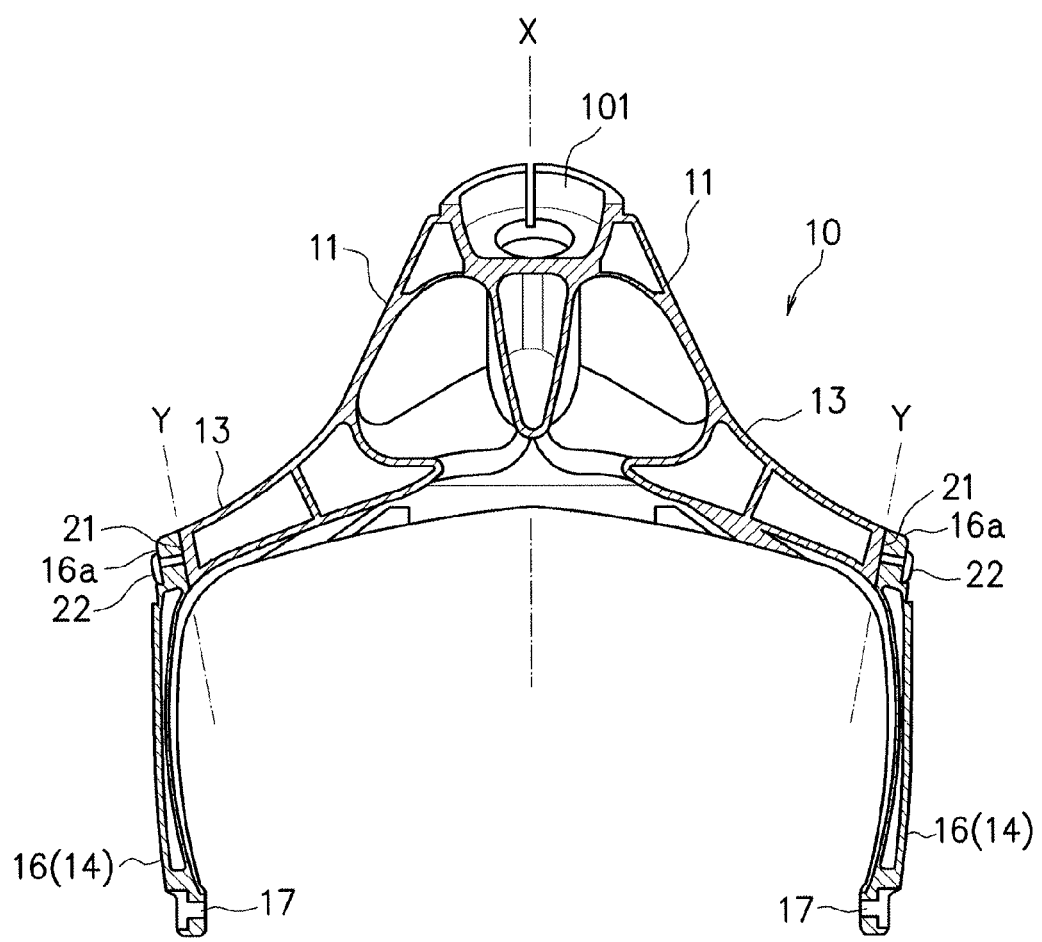
FIG. 7 is a cross-sectional view along the line I-I in FIG. 5.

As illustrated in FIG. 7, the bracket installation surface 21, which is disposed in the bulge portion 13 of the main frame 11, expands upward with respect to the vehicle body centerline X in a vehicle front view. That is, the extended lines Y of the right and left bracket installation surfaces 21 are formed to form a V shape in FIG. 7. Here, corresponding to the bracket installation surfaces 21 thus formed, the internal surfaces of the upper end portions 16a of the right and left engine suspending brackets 16 also expand upward. However, the main bodies themselves of the engine suspending brackets 16 are substantially parallel to the vehicle body centerline X, that is, are supported along the above-below direction.

Figure 8:
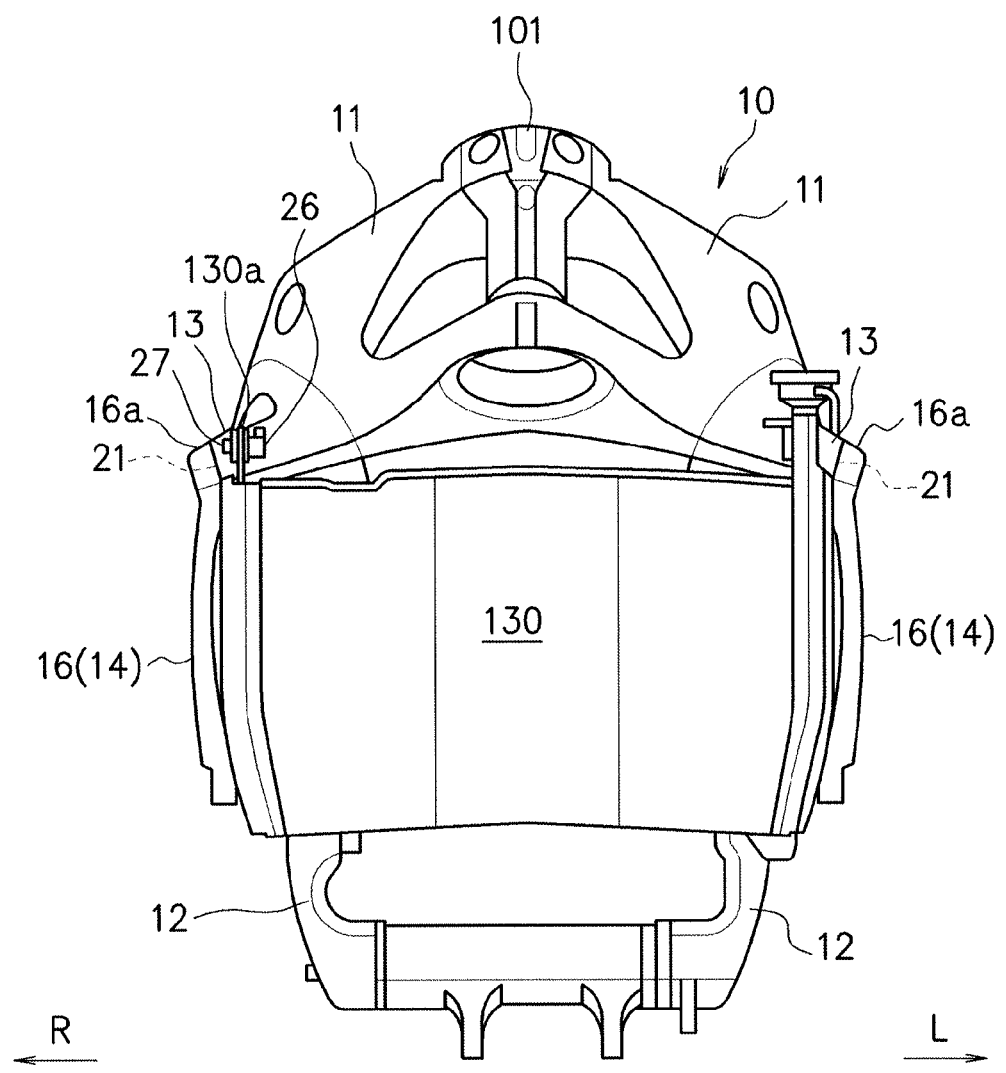
FIG. 8 is a front view of the vehicle body frame supporting a radiator according to the embodiment of the present invention.

The radiator 130 is installed on the vehicle front side of the engine suspending bracket 16 as the front hanging portion 14. The radiator 130 is mounted, in its upper and lower portions, on the main frames 11 and similar member. In the specific mounting structure of the radiator 130, firstly, with reference to FIGS. 2 and 3, an upper mounting portion 26 of the radiator 130 is formed integrally with the bulge portion 13 above and on the inner side of the bracket installation surface 21. The upper mounting portions 26 of the right and left bulge portions 13 are formed projecting in a boss shape having a mounting end surface on the left or right side. For example, as illustrated in FIG. 8, brackets 130a (in FIG. 8, only the right bracket is illustrated), which are attached to the right and left upper end portions of the radiator 130, are tightened and attached to the upper mounting portions 26 with bolts 27. In the right and left lower end portions of the radiator 130, as illustrated in FIG. 2, brackets 130b (on the left side) are attached. The radiator 130 is tightened and attached to the upper end portion of the oil cooler 131 via these brackets 130b in the appropriate position.

With respect to the radiator 130 mounted on the main frames 11 and similar member via the upper mounting portions 26 and similar portion as described above, as illustrated in FIG. 8, the bracket installation surfaces 21 are arranged in the positions having a width approximately identical to the entire lateral width of the radiator 130. That is, the positions of the right and left distal ends of the bulge portions 13 are set to be approximately identical to the entire width of the radiator 130.

Figure 9:
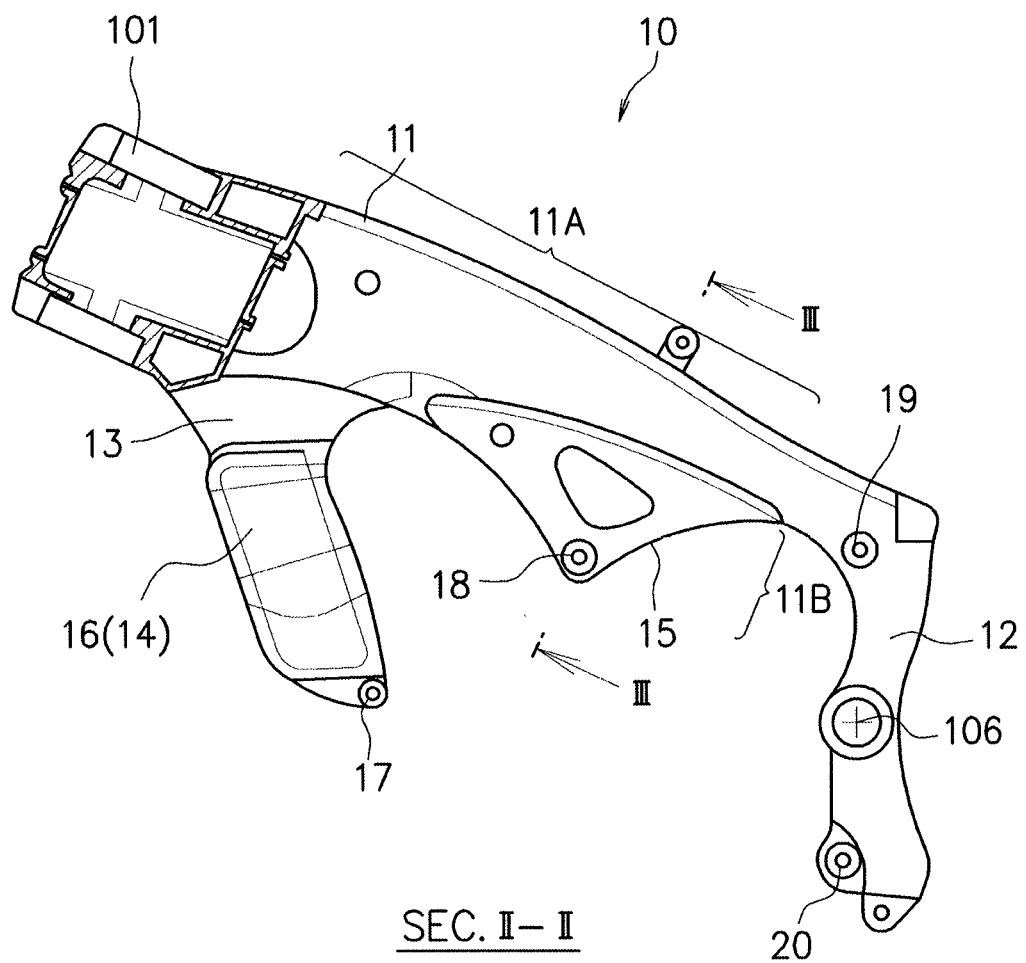
FIG. 9 is a cross-sectional view along the line II-II in FIG. 6.
Figure 10:
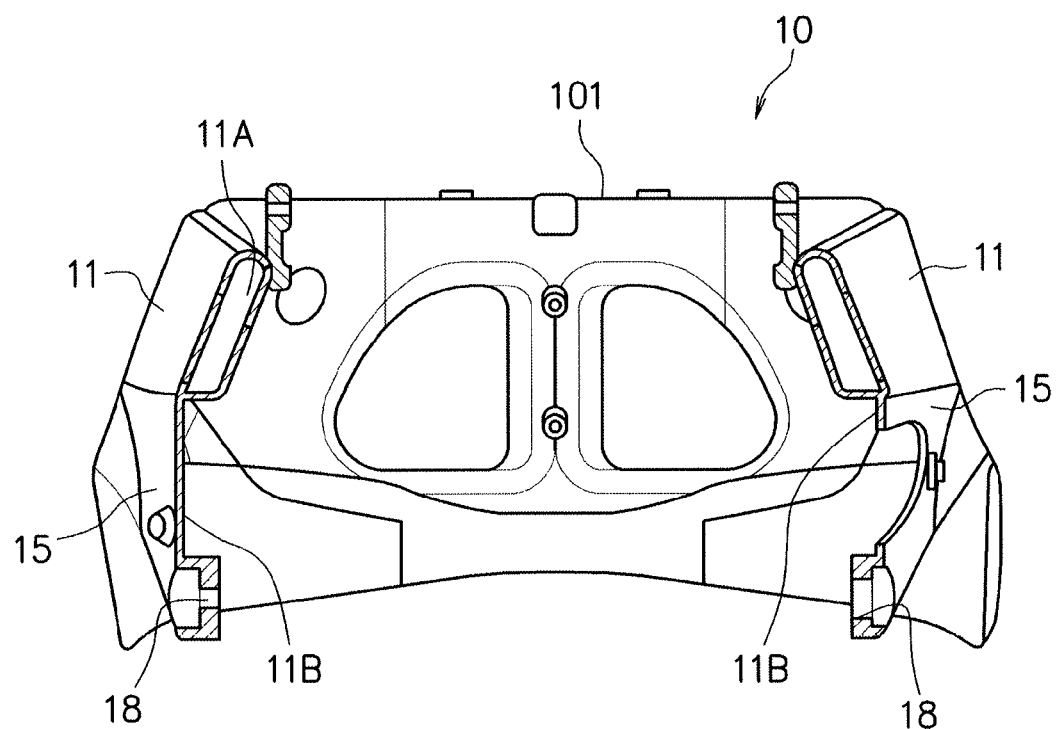
FIG. 10 is a cross-sectional view along the line III-III in FIG. 9.

Further, in the vehicle body frame structure of the motorcycle 100 according to the present invention, as illustrated in FIGS. 9 and 10, the main frame 11 has a closed cross-sectional structure (in FIG. 10, a closed cross section 11A) from the rear side of the steering head pipe 101. The range of the rear hanging portion 15 has an open cross-sectional structure (in FIG. 10, an open cross section 11B) having a vehicle-widthwise opening. The respective right and left main frames 11 branching from the steering head pipe 101 extend to be appropriately tapered rearward while maintaining those closed cross-sectional structures, and are joined to the pivot frames 12. The rear hanging portion 15 is formed in a single plate shape forming a flat surface together with the outer surface of the closed cross section 11A.

The respective engine suspending positions fastened in the front hanging portion 14 and the rear hanging portion 15 are set to face one another in positions having approximately identical widths and heights with respect to the cylinder axis and the crank axis in the engine 121. Specifically, with reference to FIG. 2, the front-lower suspending portion 17 of the engine suspending bracket 16 as the front hanging portion 14 and the front-upper suspending portion 18 of the rear hanging portion 15 have the approximately identical heights or distances from the crankshaft 122 along the cylinder axis Z, and are set to have the approximately identical widths in the positions symmetrical to the cylinder axis Z.

In the above-described case, the front hanging portion 14 can be constituted by an integral structure with the main frame 11 without using the engine suspending bracket 16. In this case, the front hanging portion 14 can be formed by light alloy die-casting or casting.

In the motorcycle 100 according to the present invention, in particular, the vehicle body frame structure is constituted as described above. The following describes, for example, its main operation and effect. The engine 121 is suspended via the plurality of engine mounts by: the front-lower suspending portion 17 and the front-upper suspending portion 18 via the front hanging portion 14 and the rear hanging portion 15 on the main frame 11 side; and the rear-upper suspending portion 19 and the rear-lower suspending portion 20 on the pivot frame 12 side, so as to be mounted and supported on the inner side of the vehicle body frame 10 with extremely high joint stiffness. With the vehicle body frame structure according to the present invention, firstly, the bulge portion 13 is disposed on the vehicle-widthwise outer side from the main frame 11, so as to allow integrally disposing the tightening portion of the engine suspending bracket 16 and the mounting portion of the radiator 130 in this bulge portion 13. This allows ensuring reduction in the number of components, weight reduction, cost reduction, and similar advantage.

In addition to the rear hanging portion 15, adding the front hanging portion 14, that is, the engine suspending bracket 16 to the front portion of the vehicle body frame 10 widens the degree of freedom in design to ensure the stiffness balance of the entire vehicle body frame 10. The addition of the engine suspending bracket 16 to the front side of the vehicle body frame 10 allows ensuring weight reduction of the vehicle body frame 10 by optimizing the lateral stiffness value while keeping, in particular, the longitudinal stiffness and torsional stiffness values of the vehicle body.

The engine suspending bracket 16 made of carbon-fiber-reinforced plastic is flexibly deformed by the load in the lateral direction, so as to contribute the reduction (optimization) in lateral stiffness of the vehicle body frame 10.

This engine suspending bracket 16 has a design surface doubling as a part of the cowling around the body cowl 117, as a characteristic design. That is, the engine suspending bracket 16 does not only function simply as the rigid member, but also provides an extremely excellent function to constitute the vehicle appearance design.

Further, the engine suspending bracket 16 has an attaching/detaching structure that is tightened and attached with the bolts 22. If the engine suspending bracket 16 is damaged during turn-over of the vehicle or similar case, it is possible to deal with the situation by removing the bolts 22 and replacing the engine suspending bracket 16 alone. That is, it is unnecessary to replace the main body side of the vehicle body frame 10 so as to reduce the user's burden related to the replacement cost or similar cost.

The bracket installation surface 21 for mounting the engine suspending bracket 16 is formed to be inclined and expand upward (in FIG. 7), so as to allow sharing the shear load on the bolts 22 for fastening. This allows reducing the count of the bolts 22 and reducing the sizes of the bolts 22, thus reducing the cost and weight.

As illustrated in FIG. 8, the radiator 130 arranged on the vehicle front side of the engine suspending bracket 16 is surrounded, in a vehicle front view, by the engine suspending brackets 16 and the bulge portions 13 disposed in the front portion of the vehicle body frame 10.

The radiator 130 is surrounded, in its right and left portions, by the engine suspending brackets 16 and, on its top surface, by the bulge portions 13 having the small wing shapes. This improves the straightening effect for passing air when travelling air received during vehicle travelling passes through the radiator 130, thus improving the discharge efficiency of hot air. This allows improving the cooling effect of cooling water by the radiator 130.

The position of the bracket installation surface 21 as the distal end (in the vehicle-width direction) of the bulge portion 13 in the vehicle body frame 10 is set to be approximately identical to the entire width of the radiator 130. The main body itself of the engine suspending bracket 16 is set to be parallel to the vehicle body centerline X (in FIG. 7). This achieves the structure where the passing air of the radiator 130 can pass the right and left engine suspending brackets 16 without resistance.

In this case, the engine suspending bracket 16 is linearly arranged approximately parallel to the vehicle body centerline X. This causes the longitudinal load and the torsional load to act in the axial force direction of the engine suspending bracket 16, thus improving the bearing force. This also allows ensuring weight reduction of the vehicle body frame 10 and thinning (in particular, shortening in the whole width direction of the vehicle body), weight reduction, and cost reduction of the engine suspending bracket 16 while keeping the longitudinal stiffness and the torsional stiffness of the vehicle body frame 10. The presence of the engine suspending bracket 16 allows reducing the excessive lateral stiffness (deformation amount) of the vehicle body frame 10, thus effectively adjusting the lateral stiffness value of the vehicle body frame 10. This allows improving the controllability and the stability during deep angle cornering or similar situation, thus guaranteeing high running safety.

The upper mounting portion 26 of the radiator 130 is formed integrally with the bulge portion 13 above and on the inner side of the bracket installation surface 21, so as to allow attaching and removing the engine suspending bracket 16 without removing the radiator 130. Thus, the engine suspending bracket 16 is removable alone. This allows improving the maintainability.

The main frame 11 of the vehicle body frame 10 has the closed cross-sectional structure from the rear side of the steering head pipe 101 and the open cross-sectional structure in the range of the rear hanging portion 15. This allows achieving weight reduction and cost reduction of the vehicle body frame 10 while keeping the required strength of stiffness. In this case, the lateral stiffness value can be substantially reduced.

Further, the engine suspending positions of the front hanging portion 14 and the rear hanging portion 15 are set to face one another in the positions having the approximately identical widths and heights with respect to the cylinder axis and the crank axis in the engine 121. This ensures the structure where the engine suspending positions are efficiently set to be extremely well-balanced.

In this case, the positions where the engine 121 and the vehicle body frame 10 are bridged are disposed in the most front positions of the crankcase 123 so as to allow effectively using the engine suspending bracket 16 as the member for balance adjustment of the stiffness value.

Next, in the motorcycle 100 according to the present invention, in particular, in the engine suspending structure, the engine suspending bracket 16 is mounted on the engine 121 side by being fastened with bolts to the suspension boss portion disposed integrally with the crankcase 123 or the cylinder block 124. In this example, with reference to FIG. 11, suspension boss portions 134 are disposed projecting forward in the right and left end portions near the front-side lower portion of the cylinder block 124. On this suspension boss portion 134, the front-lower suspending portion 17 of the engine suspending bracket 16 is placed from the right or left outer side. From the right or left outer side, a bolt 135 is threadably mounted on the suspension boss portion 134, so as to tighten and attach the engine suspending bracket 16. Thus, the tightening of the engine suspending bracket 16 to the engine 121 side is set to the position that allows tightening from the vehicle lateral side.

Here, while in this illustrated example, the suspension boss portion 134 is disposed in the cylinder block 124, the suspension boss portion 134 can be disposed projecting forward in the front lower portion of the casing assembly of the above-described engine unit and, similarly, the front-lower suspending portion 17 is tightened and attached.

On the other hand, the engine suspending bracket 16 is mounted on the vehicle body frame 10 side as described above, as illustrated in FIG. 3, FIG. 4, and similar drawing, by being fastened with the bolts 22 to the bracket installation surface 21, which is disposed integrally with the distal end of the bulge portion 13 of the main frame 11, from the right or left outer side. Thus, the tightening of the engine suspending bracket 16 to the vehicle body frame 10 side is set to the position that allows tightening from the vehicle lateral side.

As illustrated in FIG. 2, the engine suspending bracket 16 mounted on the engine 121 side or the vehicle body frame 10 side as described above overlaps a part (a respective part of the cylinder block 124, the cylinder head 125, and the cylinder head cover 126) of the engine 121 in a vehicle side view.

In this case, further, as illustrated in FIG. 2, the engine suspending bracket 16 can be arranged to overlap the radiator 130 arranged on its vehicle front side. The front portion side of the engine suspending bracket 16 overlaps the rear surface side of the radiator 130 in a vehicle side view in FIG. 2.

Figure 12:
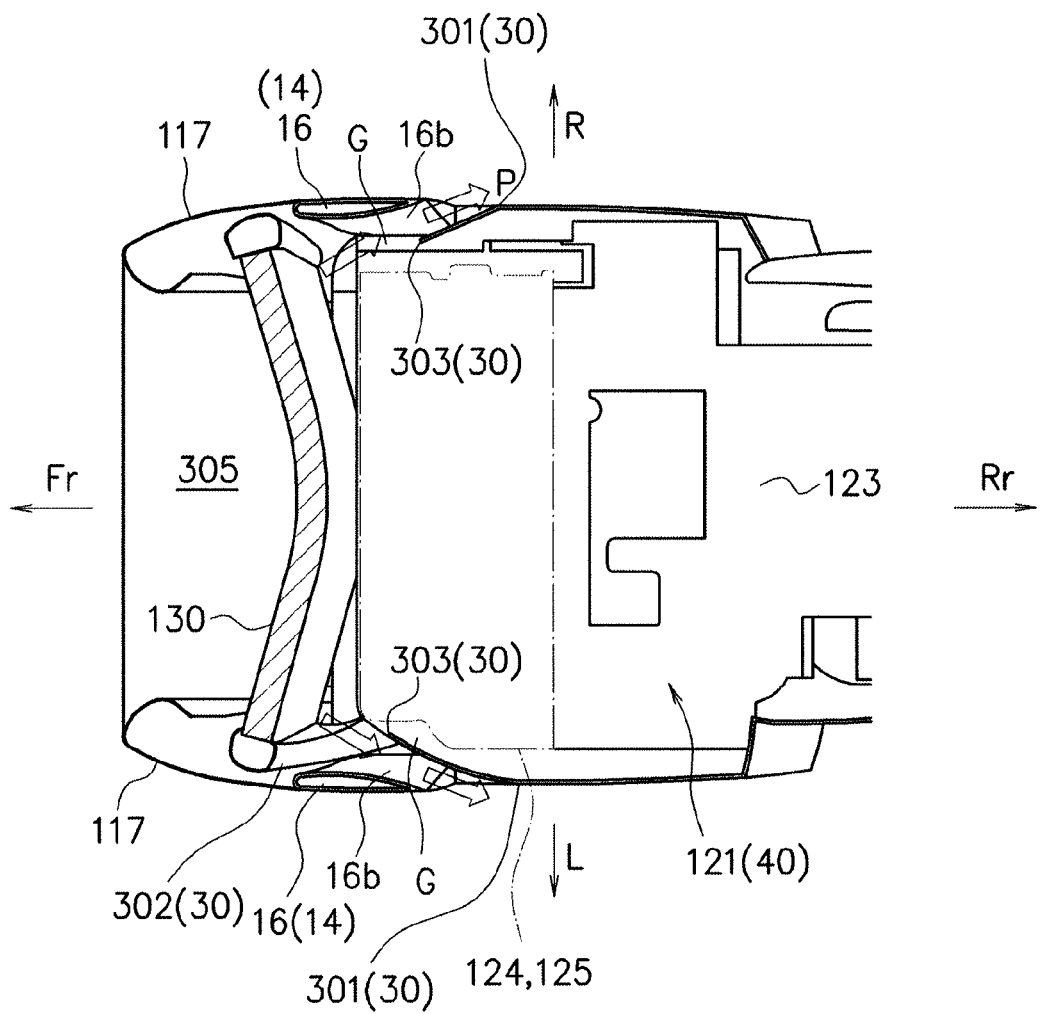
FIG. 12 is a cross-sectional view along the line IV-IV in FIG. 2.
Figure 13:
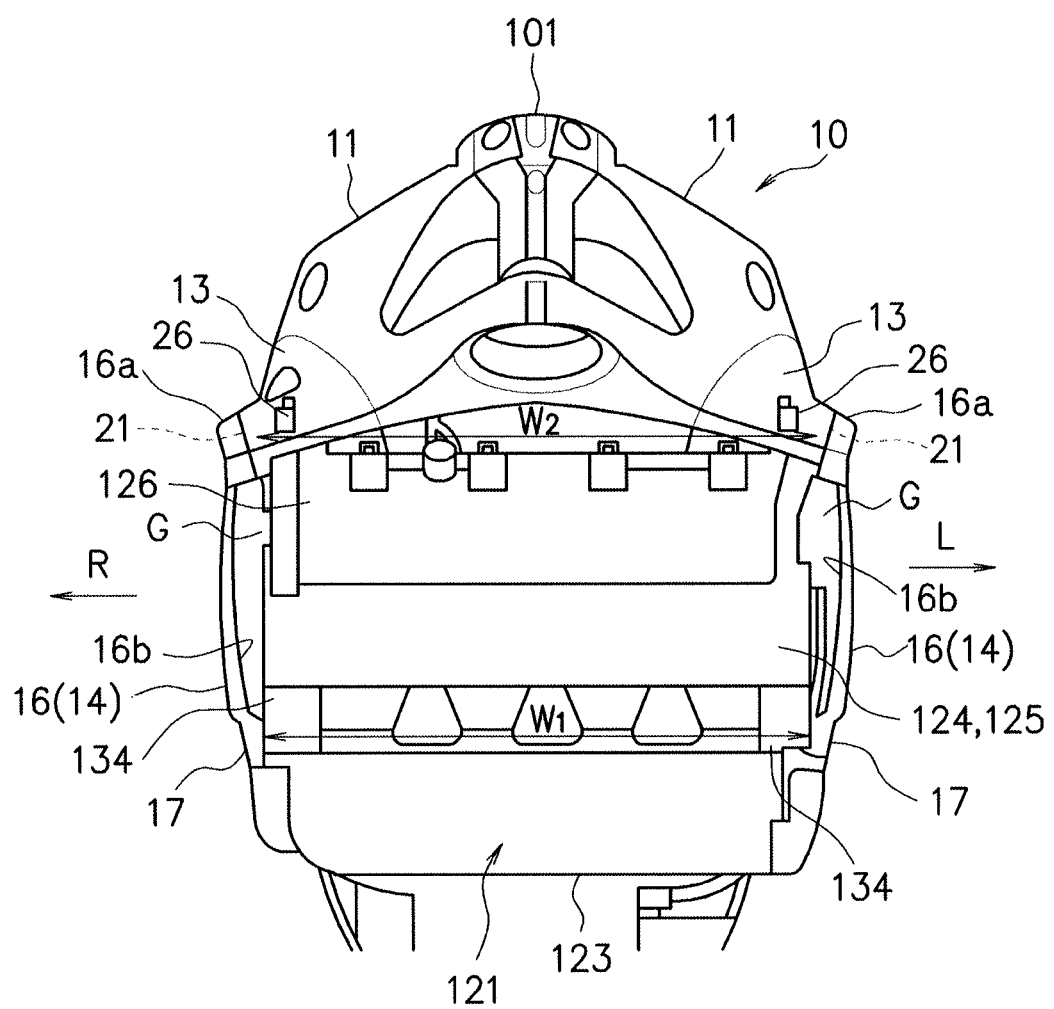
FIG. 13 is a front view illustrating the vehicle body frame on which the engine is mounted according to the embodiment of the present invention.

Next, with reference to FIG. 12 (a vehicle top view) and FIG. 13 (a vehicle front view), the engine suspending bracket 16 has an inner surface 16b that has a gap G with the cylinder block 124 and the cylinder head 125 of the engine 121 so as to allow guiding the hot air generated in the radiator 130 to the rear side of the vehicle body via the gap G (in FIG. 12, by an arrow P). The shapes of the inner surfaces 16b of the right and left engine suspending brackets 16 are formed rearward while expanding to the left or right outer side.

As illustrated in FIG. 8, in a vehicle front view, the radiator 130 is surrounded by the engine suspending brackets 16 and the bulge portions 13 disposed in the front of the main frame 11.

In this case, as illustrated in FIG. 13, a mounting width $W_1$ of the suspension boss portions 134 as the mounting portions of the engine suspending bracket 16 on the engine 121 side is a width approximately identical to a mounting width $W_2$ of the bracket installation surfaces 21 of the bulge portions 13 as the mounting portions of the engine suspending bracket 16 on the main frame 11 side.

The engine suspending bracket 16 is bridged over the above-below direction from the bracket installation surface 21 on the main frame 11 side to the suspension boss portion 134 on the cylinder block 124 (or the crankcase 123) side. The main body surface of the engine suspending bracket 16 is arranged approximately parallel to the vehicle body centerline X (see FIG. 7).

Here, as illustrated in FIG. 14, removal of the engine suspending bracket 16 from the bulge portion 13 causes opening of the lateral side of the engine 121. This allows easily accessing the cylinder block 124 or the cylinder head 125. Thus, the engine suspending bracket 16 can be removed to carry out maintenance work or similar work around the cylinder block 124.

In the motorcycle 100 according to the present invention, in particular, the engine suspending structure is constituted as described above. The following describes, for example, its main operation and effect. The engine suspending bracket 16 is mounted on the engine 121 side by being fastened, with the bolt 135, to the suspension boss portion 134, which is disposed integrally with the crankcase 123 (or the cylinder block 124), and is mounted on the vehicle body frame 10 side by being fastened, with the respective bolts 22, to the bracket installation surface 21, which is disposed in the bulge portion 13 of the main frame 11.

The attaching/detaching structure of the engine suspending bracket 16 as just described allows dealing with the damage during turn-over or similar case by replacing the engine suspending bracket 16 alone. That is, no replacement on the vehicle body frame 10 side is necessary, and this reduces the user's burden such as a replacement cost.

The tightenings of the engine suspending bracket 16 to both the engine 121 side and the vehicle body frame 10 side are set to the positions that allow tightening from the vehicle lateral side.

Thus, arranging the engine suspending brackets 16 in the positions that allow tightening from the vehicle-body lateral side allows assembling the engine suspending brackets 16 from the vehicle lateral side in the final process where the engine 121, the radiator 130, and the pipes are mounted, so as to dramatically improve the assembling workability and similar parameter.

As illustrated in FIG. 2, the engine suspending bracket 16 overlaps a part of the engine 121, that is, the cylinder block 124, the cylinder head 125, or similar member in a vehicle side view.

This overlapping of the engine suspending bracket 16 allows arranging the components such as the radiator 130 arranged on the front side of the engine suspending bracket 16 close together in the vehicle front-rear direction. This contributes to shortening of the wheelbase of the vehicle, weight reduction of the vehicle, and downsizing.

The inner surface 16b of the engine suspending bracket 16 has the gap G with the cylinder block 124 and the cylinder head 125. The inner surface 16b is formed rearward while expanding to the left or right outer side.

The appropriate gap G between: the engine components such as the cylinder block 124 and the cylinder head 125; and the engine suspending bracket 16 improves the straightening effect for the flowing air, thus significantly improving the discharge efficiency of the hot air having passed the radiator 130. In this case, the shape of the inner surface 16b of the engine suspending bracket 16 is the wing shape expanding outward. This further facilitates the improvement in straightening effect so as to improve the discharge efficiency of hot air.

The radiator 130 in a vehicle front view is surrounded by the engine suspending brackets 16 and the bulge portions 13 disposed in the front of the main frame 11.

Accordingly, the radiator 130 is surrounded, in its right and left portions, by the engine suspending brackets 16 and, on its top surface, by the bulge portions 13 having the small wing shapes. This improves the straightening effect for the passing air in the radiator 130 so as to further improve the discharge efficiency of hot air.

As illustrated in FIG. 2, the engine suspending bracket 16 can be arranged overlapping the radiator 130, which is arranged on the vehicle front side of the engine suspending bracket 16.

Thus, the engine suspending brackets 16 are arranged in the positions with a width wider in the vehicle-width direction than the widths of the engine 121 and the radiator 130. This allows moving the engine suspending brackets 16 in the front-rear direction corresponding to the design shape of the cowling. This provides the advantage that widens the degree of freedom in design and the like.

The mounting width $W_1$ of the suspension boss portions 134 as the mounting portions of the engine suspending bracket 16 on the engine 121 side is the width approximately identical to the mounting width $W_2$ of the bracket installation surfaces 21 of the bulge portions 13 as the mounting portions on the main frame 11 side. Thus, the approximately identical upper and lower mounting widths of the engine suspending brackets 16 causes the main bodies themselves of the engine suspending brackets 16 to be parallel to the vehicle body centerline X (in FIG. 7) so as to achieve the structure where the passing air of the radiator 130 can pass the right and left engine suspending brackets 16 without resistance.

The bracket installation surface 21 for mounting the engine suspending bracket 16 is formed to be inclined and expand upward (in FIG. 7), so as to allow sharing the shear load on the bolts 22 for fastening. This allows reducing the count of the bolts 22 and allows reducing the sizes of the bolts 22, thus reducing the cost and weight.

The radiator 130 has the upper end portion bolt-fastened to the upper mounting portion 26, which is integrally arranged on the top surface of the bulge portion 13, and the lower end portion bolt-fastened to the oil cooler 131, which is arranged on the lower side.

This allows attaching and removing the engine suspending bracket 16 without removing the radiator 130, that is, allows removing the engine suspending bracket 16 alone, thus improving the maintainability.

Figure 15:
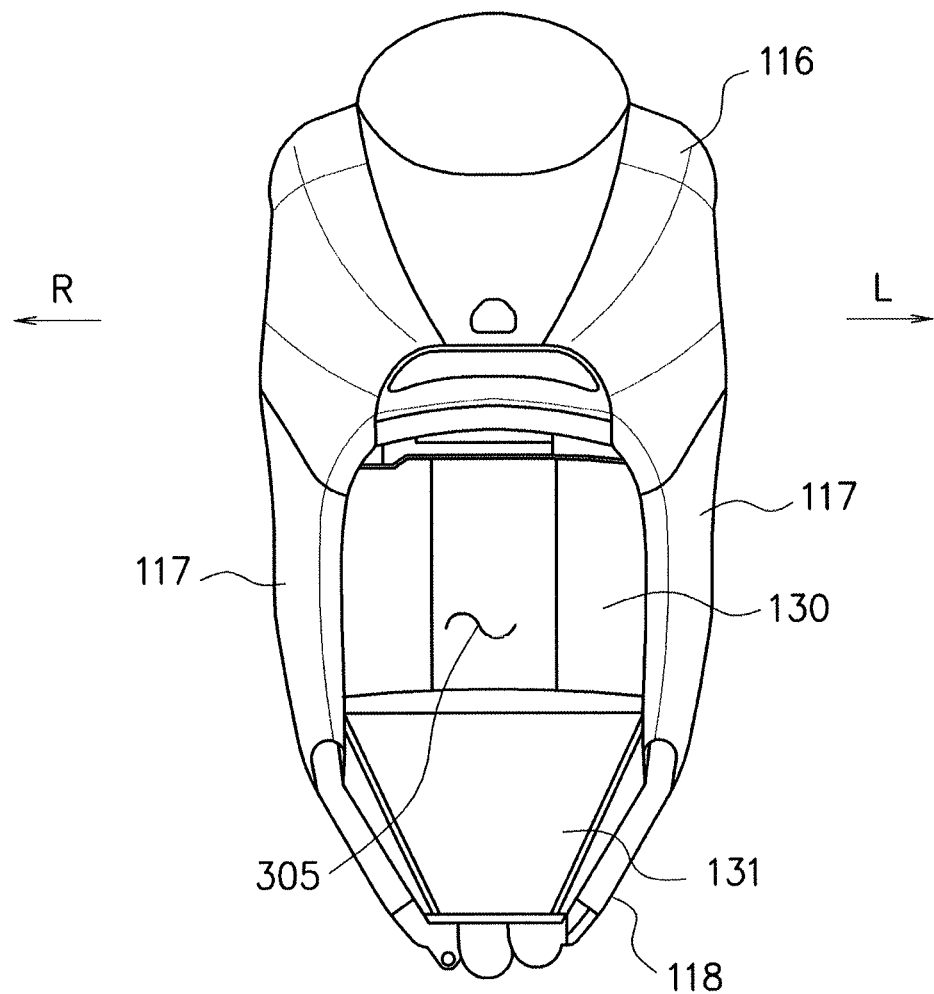
FIG. 15 is a front view schematically illustrating a configuration example of a cowling according to the embodiment of the present invention.
Figure 17:
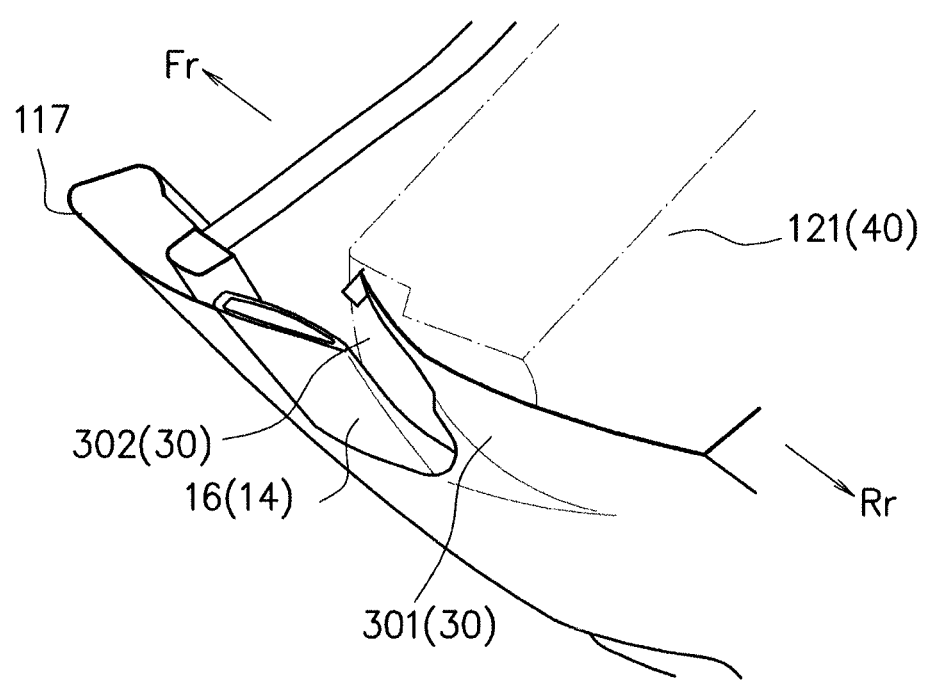
FIG. 17 is a perspective view schematically illustrating a configuration example of a body cowl according to the embodiment of the present invention.
Figure 18A:
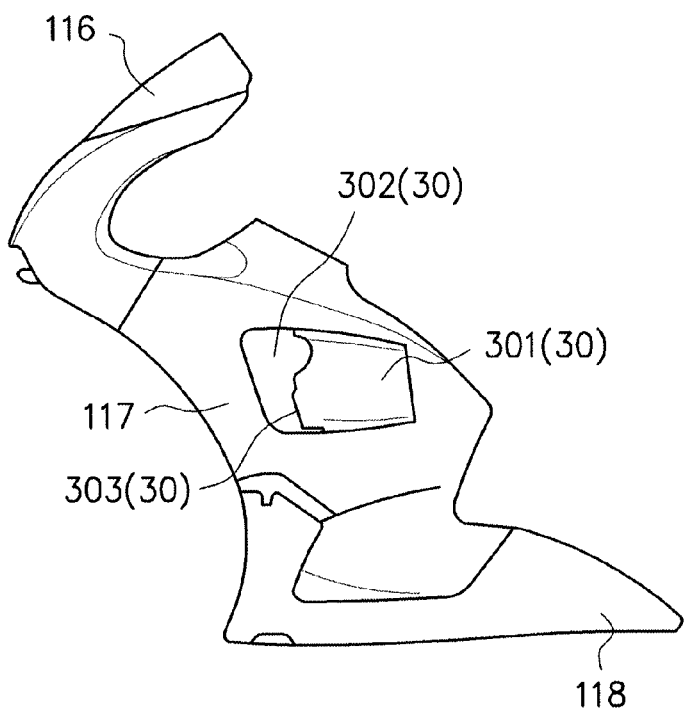
FIG. 18A is a view schematically illustrating a configuration example of the cowling according to the embodiment of the present invention in a view from the vehicle-widthwise outer side.
Figure 18B:
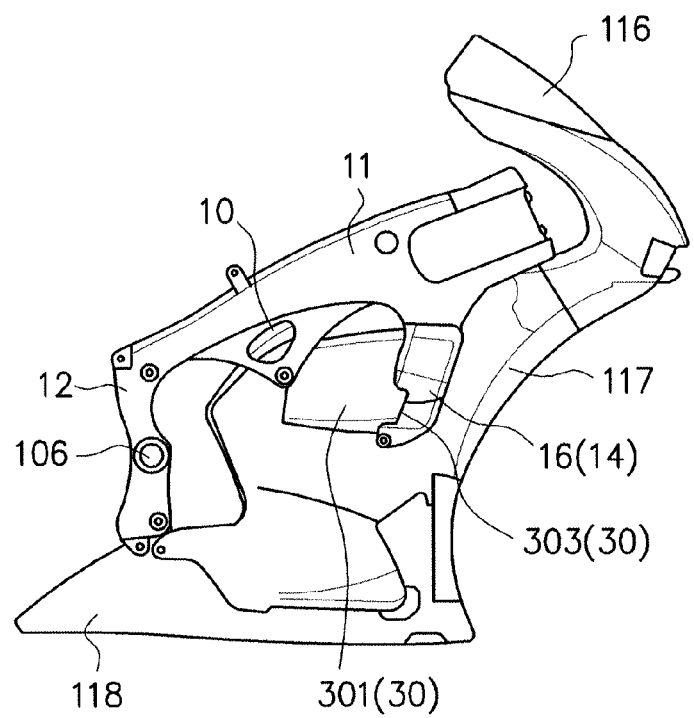
FIG. 18B is a view schematically illustrating the configuration example of the cowling according to the embodiment of the present invention in a view from the vehicle-widthwise center side.

The following describes the configuration of, in particular, the cowling in the motorcycle 100 of the present invention with reference to FIGS. 12 and 15 to 18B. FIG. 15 is a front view schematically illustrating a configuration example of the cowl according to the embodiment of the present invention. FIG. 16 is a side view schematically illustrating the configuration example of the cowl according to the embodiment of the present invention. FIG. 17 is a perspective view schematically illustrating the configuration example of the body cowl 117. FIG. 18A is a view schematically illustrating the configuration example of the cowl according to the embodiment of the present invention in a view from the vehicle-widthwise outer side. FIG. 18B is a view schematically illustrating the configuration example of the cowl according to the embodiment of the present invention in a view from the vehicle-widthwise center side.

The motorcycle 100 has the cowling as the vehicle exterior. In the embodiment of the present invention, the cowling includes the upper cowl 116, the right and left body cowls 117, the under cowl 118, the right and left side cowls 119, and the right and left seat cowls 120 (see FIG. 1). The upper cowl 116, the right and left body cowls 117, and the under cowl 118 are integrally joined to cover the front portion of the motorcycle 100. The right and left side cowls 119 cover both the respective side portions of the motorcycle 100. The right and left seat cowls 120 are disposed around the seat 114 in the vehicle rear portion. These cowlings including the body cowls 117 are made of synthetic resin and manufactured by injection molding using a molding die.

As illustrated in FIGS. 12 and 15 to 18B, the body cowl 117 is a shell-shaped member. The respective right and left body cowls 117 are removably mounted on the respective right and left outer sides of the vehicle body frame 10 in the vehicle-width direction with bolts or similar fixture. Then, the body cowls 117 cover both the right and left outer sides of an engine unit 40 including the engine 121 and similar member and the radiator 130.

As illustrated in FIG. 15, in the front portion of the body cowl 117, an air intake hole 305 is formed for taking in air for cooling the radiator 130. In other words, the front side of the body cowl 117 is opened so as to take in air for cooling from the opened air intake hole 305. For example, as illustrated in FIG. 15, in a vehicle front view, the respective right and left body cowls 117 are arranged on both the vehicle-widthwise outer sides of the radiator 130. The upper cowl 116 is arranged over the radiator 130. In the vehicle front view, the radiator 130 and the oil cooler 131 seem to be exposed through the air intake hole 305 formed on the body cowl 117.

The radiator 130 is disposed on the front side of the engine suspending bracket 16, and arranged, in a vehicle front view, in the area surrounded by the right and left engine suspending brackets 16 and the bulge portions 13 disposed in the main frame 11. This configuration improves the straightening effect for passing air when travelling air passes through the radiator 130 during travelling of the motorcycle 100. This allows improving the discharge efficiency of hot air, thus improving the cooling effect of cooling water by the radiator 130.

As illustrated in FIGS. 16 to 18B, on the side surface of the body cowl 117, an air discharging portion 30 is disposed to discharge the air (hot air) having passed the radiator 130 to the outside. The air discharging portion 30 is constituted of an air discharge hole 302 and a stepped portion 301, and is disposed on the rear side of the radiator 130 as illustrated in FIGS. 12, 16, and 17. The air discharge hole 302 is the opening portion (through-hole) communicating between the vehicle-widthwise center side and outer side. The stepped portion 301 is the portion having a stepped surface shape depressed toward the vehicle-widthwise center side relative to the portion around the air discharging portion 30. As illustrated in FIG. 16 and similar drawing, the air discharge hole 302 is formed in the position biased to the front of the air discharging portion 30, and the stepped portion 301 is formed on the rear side of the air discharge hole 302.

In the air discharging portion 30, the engine suspending bracket 16 is disposed in the position facing the air discharge hole 302. That is, as illustrated in FIGS. 12, 16, and 17, in a vehicle side view, the vehicle-widthwise outer surface of the engine suspending bracket 16 is exposed to the vehicle-widthwise outer side through the air discharge hole 302 of the air discharging portion 30 of the body cowl 117. The exposed portion in the engine suspending bracket 16 is formed in a shape continuous with the portion around the air discharging portion 30 of the body cowl 117. In the embodiment of the present invention, the peripheral portion of the air discharging portion 30 of the body cowl 117 is formed as the curved surface projecting vehicle-widthwise outward in a top view. In this case, this exposed portion of the engine suspending bracket 16 is also formed as the curved surface projecting vehicle-widthwise outward in a top view, so as to be continuous with the curved surface of the body cowl 117. With this configuration, the engine suspending bracket 16 functions as a part of the body cowl 117, and constitutes the design of the appearance of the motorcycle 100. This improves the visual unity between the engine suspending bracket 16 and the body cowl 117. Thus, exposing a part of the engine suspending bracket 16 to the vehicle-widthwise outer side through the air discharge hole 302 of the air discharging portion 30 allows providing the feature to the appearance of the motorcycle 100.

Furthermore, the configuration where the engine suspending bracket 16 is disposed in the position facing the air discharge hole 302 allows improving the beauty of the appearance of the motorcycle 100. That is, in the state where the engine suspending bracket 16 is not mounted on the vehicle body frame 10, in a vehicle side view, the equipment such as the engine unit 40 and the components are viewable from the vehicle-widthwise outer side of the body cowl 117 through the air discharge hole 302. In contrast, the configuration where the engine suspending bracket 16 is disposed in the position facing the air discharge hole 302 causes overlapping between the air discharge hole 302 and the engine suspending bracket 16 in a vehicle side view. Accordingly, the engine suspending bracket 16 hides the air discharge hole 302 such that the equipment such as the engine unit 40 and the components are not viewable from the vehicle-widthwise outer side of the body cowl 117. This improves the beauty of the appearance of the motorcycle 100.

As illustrated in FIGS. 12 and 17, the stepped portion 301 of the air discharging portion 30 has the configuration in the stepped surface shape depressed toward the vehicle-widthwise center side from the vicinity of the air discharging portion 30. The stepped portion 301 of the air discharging portion 30 has the vehicle-widthwise outer side surface smoothly projecting vehicle-widthwise outward from the front side toward the rear side, so as to allow smoothly guiding the air having passed the radiator 130 to the outer side of the body cowl 117. In other words, the stepped portion 301 approaches the vehicle-widthwise center from the rear side toward the front side. To smoothly guide the air having passed the radiator 130 to the outer side of the body cowl 117, a front end portion 303 of the stepped portion 301 is preferred to be close to the vehicle-widthwise center as much as possible. The front end portion 303 of the stepped portion 301 moves closer to the vehicle-widthwise center so as to be closer to the equipment such as the engine unit 40 (the engine 121) and the components.

Therefore, in the embodiment of the present invention, to avoid the interference between: the front end portion 303 of the stepped portion 301; and the equipment such as the engine unit 40 (the engine 121) and the components, the front end portion 303 of the stepped portion 301 is formed in the shape corresponding to (modeled after) the outer shapes (profiles) of the equipment such as the engine unit 40 and the components. This configuration allows moving the front end portion 303 of the stepped portion 301 closer to the vehicle-widthwise center while preventing the interference between: the stepped portion 301; and the equipment such as the engine unit 40 and the components. This allows smoothly guiding the air having passed the radiator 130 to the outer side of the body cowl 117. Here, the specific shape of the front end portion 303 of the stepped portion 301 is not limited in particular. The shape of the front end portion 303 is set corresponding to the outer shapes such as the equipment and the components disposed on the vehicle-widthwise center side of the front end portion 303.

The vehicle-widthwise center side surface of the engine suspending bracket 16 is inclined to expand rearward to the vehicle-widthwise outer side. That is, the distance between the vehicle-widthwise center-side surfaces of the right and left engine suspending bracket 16 increases rearward. This configuration allows increasing the straightening efficiency for the air passing through the air discharging portion 30, thus increasing the efficiency to discharge the air having passed the radiator 130. Here, while FIGS. 12 and 17 illustrate the configuration where the engine suspending bracket 16 is formed to be hollow, the configuration is not limited to this. The engine suspending bracket 16 may be hollow or solid.

As described above, the vehicle-widthwise outer side surface of the engine suspending bracket 16 is formed as the curved surface projecting vehicle-widthwise outward in a vehicle top view. The vehicle-widthwise inner side surface is inclined to expand vehicle-widthwise outward. Accordingly, the cross-sectional shape of the engine suspending bracket 16 is formed in a spindle shape similar to the cross-sectional shape of the wing of an airplane as illustrated in FIGS. 12 and 17. That is, the engine suspending bracket 16 has a large thickness (vehicle-widthwise dimension) approximately in the center in the front-rear direction and smoothly becomes thinner toward the front side and the rear side, with reference to the front-rear direction of the motorcycle 100.

As illustrated in FIGS. 18A and 18B, in a vehicle side view, the engine suspending bracket 16 overlaps a part of the stepped portion 301 including the front end portion 303. That is, the engine suspending bracket 16 is disposed in the position apart from the vehicle-widthwise outer side of the front end portion 303 of the stepped portion 301 by a certain distance. Accordingly, in a vehicle side view, the front end portion 303 of the stepped portion 301, that is, the portion formed in the shape corresponding to (modeled after) the profiles of the equipment such as the engine unit 40 and the components is hidden by the engine suspending bracket 16 not to be seen from the vehicle-widthwise outer side. Accordingly, this configuration does not ruin the beauty of the appearance of the motorcycle 100.

In the configuration where a part including the front end portion of the stepped portion 301 overlaps the engine suspending bracket 16 at a certain distance in the vehicle-width direction, the stepped portion 301 and the engine suspending bracket 16 form the path of the air (hot air) having passed the radiator 130. This improves the straightening efficiency for air, thus improving the discharge efficiency of the air having passed the radiator 130.

As illustrated in FIG. 18A, the air discharge hole 302 of the air discharging portion 30 is opened to communicate between the vehicle-widthwise center side and outer side in a vehicle side view. That is, in the state where the engine suspending bracket 16 is not mounted, in a side view, the equipment such as the engine unit 40 and the components are viewable from the vehicle-widthwise outer side of the body cowl 117 through the air discharge hole 302. The engine suspending bracket 16 is disposed to face this air discharge hole 302 so as to visually hide the air discharge hole 302 from a side view. This configuration eliminates the need for an undercut process in the case where the body cowl 117 is manufactured by injection molding using a molding die. That is, forming the structure overlapping the air discharge hole 302 integrally with the body cowl 117 requires an overlap between the air discharge hole 302 and this structure in the pulling direction of the molding die. This requires the undercut process when the body cowl 117 is manufactured by injection molding.

In contrast, the embodiment of the present invention employs the configuration where the air discharge hole 302 overlaps the engine suspending bracket 16 separated from the body cowl 117. That is, the structure overlapping the air discharge hole 302 may not be formed in the body cowl 117. Accordingly, the manufacture of the body cowl 117 by injection molding eliminates the need for the undercut process. This avoids the complicated structure of the molding die used for injection molding of the body cowl 117.

While the present invention has been described using various embodiments above, the present invention is not limited only to these embodiments. Changes and similar modification are possible within the scope of the present invention.

While the vehicle body frame 10 has been described using the example of the typical twin-spar frame, the present invention is also applicable to the case of a part of what is called a diamond frame or a box frame. The count of the bolts 22 and similar parameter can be increased and decreased as necessary.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

The present invention allows integrally disposing the tightening portion of the engine suspending bracket and the mounting portion of the radiator in the bulge portion disposed on the vehicle-widthwise outer side from the vehicle body frame. This allows ensuring reduction in the number of components, weight reduction, cost reduction, and similar advantage.

According to the present invention, the engine suspending bracket employs an attaching/detaching structure, and its tightening is set to the position that allows tightening from the vehicle lateral side. This allows replacing the engine suspending bracket alone, thus improving the maintainability. The engine suspending bracket is arranged overlapping the engine, the radiator, and similar member, so as to allow effectively achieving weight reduction and downsizing of the vehicle.

Further, according to the present invention, a part of the air discharging portion disposed in the cowling overlaps the bracket in the vehicle-width direction. Accordingly, the equipment covered with the cowling is hidden not to be seen through the air discharging portion. This allows improving the beauty of the appearance of the motorcycle.

What is claimed is:

1. A motorcycle comprising:
    a vehicle body frame including a right and left pair of main frames extending from a head pipe while widening rearward, and pivot frames welded to the main frames, the pivot frames extending toward a rear downward direction;
    an engine arranged under the main frames;
    a heat replacer equipped on a vehicle front side of the engine, the heat replacer comprising a radiator and an oil cooler; and
    hanging portions holding and fastening the engine to the main frames, the hanging portions comprise:
        a front hanging portion set to a front portion of the main frames; and
        a rear hanging portion set to a center portion of the main frames,
    wherein the front hanging portion includes a separate engine suspending bracket,
    wherein the main frames include a front portion having a bulge portion on a vehicle-widthwise outer side, and one of the hanging portions is settable to the bulge portion,
    wherein the engine suspending bracket is mounted on the engine by being fastened with bolts to a suspension boss portion disposed integrally with one of a crankcase and a cylinder block, and mounted on the vehicle body frame by being fastened with bolts to a bracket installation surface disposed integrally with a distal end of the bulge portion of the main frames,
    wherein the engine suspending bracket overlaps a part of the engine in a vehicle side view, and
    wherein the engine suspending bracket has an inner surface having a gap with a cylinder and a cylinder head of the engine in a vehicle top view, the inner surface guiding heat generated in the radiator to a rear side of a vehicle body, and the engine suspending bracket has an inner surface shape formed expanding outward.

2. The motorcycle according to claim 1, wherein the bracket installation surface disposed in the main frames expands upward with respect to a vehicle body centerline in a vehicle front view.

3. The motorcycle according to claim 1,
    wherein the radiator is installed on a vehicle front side of the front hanging portion, and
    wherein the radiator has an upper mounting portion disposed integrally with the bulge portion of the main frames.

4. The motorcycle according to claim 3, wherein the upper mounting portion of the radiator is arranged integrally with the bulge portion of the main frames above and on an inner side of the bracket installation surface.

5. The motorcycle according to claim 1, wherein the bracket installation surface is disposed in positions having a width approximately identical to an entire lateral width of the radiator.

6. The motorcycle according to claim 1, wherein the main frames have a closed cross-sectional structure from a rear side of the head pipe, and have an open cross-sectional structure having a vehicle-widthwise opening in a range of the rear hanging portion.

7. The motorcycle according to claim 1, wherein the front hanging portion and the rear hanging portion are fastened to the engine in engine suspending positions, the engine suspending positions being set to face one another in positions having approximately identical widths and heights with respect to a cylinder axis and a crank axis of the engine.

8. The motorcycle according to claim 1, wherein the front hanging portion is configurable by an integral structure with the main frames, and is formable by light alloy die-casting or casting.

9. The motorcycle according to claim 1, wherein the engine suspending bracket bridged between the engine and the main frames is tightened in a position that allows tightening both the engine and the main frames from a vehicle lateral side of the motorcycle.

10. The motorcycle according to claim 1, wherein the engine suspending bracket is arrangeable overlapping the radiator arranged on the vehicle front side.

11. The motorcycle according to claim 1, wherein the suspension boss portion as a mounting portion of the engine suspending bracket on the engine has a mounting width approximately identical to a mounting width of the bracket installation surface of the bulge portion as a mounting portion on the main frames.

12. The motorcycle according to claim 1, wherein the bracket installation surface disposed in the main frames expands upward with respect to a vehicle body centerline in a vehicle front view.

13. The motorcycle according to claim 1, wherein the engine suspending bracket is bridged over an above-below direction from the bracket installation surface of the main frames to the suspension boss portion on the crankcase, and the engine suspending bracket has a main body surface arranged approximately parallel to a vehicle body centerline.

14. The motorcycle according to claim 1, wherein the radiator comprises:
an upper end portion bolt-fastened to an upper mounting portion arranged integrally with the bulge portion of the main frames; and
a lower end portion bolt-fastened to a predetermined portion of the oil cooler.

15. The motorcycle according to claim 1,
wherein the radiator is configured to cool a refrigerant of the engine; and the motorcycle further comprising a cowling that covers an outer side of the engine,
wherein the cowling comprises an air discharging portion, on a lateral side, configured to discharge air having passed the radiator to an outside of the cowling, and
wherein the engine suspending bracket that secures the engine to the vehicle body frame is formed separately from the vehicle body frame, and overlaps at least a part of the air discharging portion in the vehicle side view.

16. The motorcycle according to claim 15, wherein the air discharging portion comprises:
an air discharge hole opened in the vehicle side view; and
a stepped portion disposed on a rear side of the air discharge hole, the stepped portion being depressed to a vehicle-widthwise inner side,
wherein the stepped portion is formed in a shape along an outer shape of an equipment arranged on an inner side of the cowling.

17. The motorcycle according to claim 16, wherein a part of the engine suspending bracket overlaps a part of the stepped portion in the vehicle side view.

18. The motorcycle according to claim 15, wherein the radiator is arranged in a position surrounded by the bulge portion and the engine suspending bracket in a vehicle front view.

19. The motorcycle according to claim 15, wherein
the engine suspending bracket has a vehicle-widthwise outer side surface formed in a shape continuous with a vehicle-widthwise outer side surface of the cowling, and
the engine suspending bracket has a vehicle-widthwise inner side surface inclined to expand to the vehicle-widthwise outer side toward the rear side.

20. The motorcycle according to claim 1, wherein the radiator is surrounded by the engine suspending bracket and the bulge portion disposed in a front side of the main frames in a vehicle front view.

* * * * *